USO11694333B1

(12) United States Patent
Knuffman

(10) Patent No.: US 11,694,333 B1
(45) Date of Patent: Jul. 4, 2023

(54) PERFORMING SEMANTIC SEGMENTATION OF 3D DATA USING DEEP LEARNING

(71) Applicant: STATE FARM MUTUAL AUTOMOBILE INSURANCE COMPANY, Bloomington, IL (US)

(72) Inventor: Ryan Knuffman, Danvers, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 192 days.

(21) Appl. No.: 17/031,612

(22) Filed: Sep. 24, 2020

Related U.S. Application Data

(60) Provisional application No. 62/970,263, filed on Feb. 5, 2020.

(51) Int. Cl.
*G06N 3/08* (2023.01)
*G06T 7/11* (2017.01)
*G06N 3/04* (2023.01)

(52) U.S. Cl.
CPC .............. *G06T 7/11* (2017.01); *G06N 3/04* (2013.01); *G06N 3/08* (2013.01); *G06T 2207/10028* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 11,176,693 B1* | 11/2021 | Gonzalez-Nicolas | ................. G06K 9/6271 |
| 11,205,443 B2* | 12/2021 | Thuillier | .............. G06N 3/0454 |
| 11,317,840 B2* | 5/2022 | Youn | ..................... G06N 3/0454 |
| 11,370,423 B2* | 6/2022 | Casas | ..................... G06N 20/00 |
| 2004/0041805 A1* | 3/2004 | Hayano | ................... G06T 17/00 345/419 |
| 2010/0201682 A1* | 8/2010 | Quan | ..................... G06T 15/04 382/173 |
| 2014/0212028 A1* | 7/2014 | Ciarcia | ................... G06T 17/05 382/154 |
| 2014/0218607 A1* | 8/2014 | Wilkins | .................. G09G 5/14 348/441 |

(Continued)

Primary Examiner — Cindy Trandai
(74) Attorney, Agent, or Firm — Marshall, Gerstein & Borun LLP

(57) ABSTRACT

A deep artificial neural network (DNN) for generating a semantically-segmented three-dimensional (3D) point cloud is manufactured by a process including obtaining a 3D point cloud, establishing a DNN topology, training the DNN to output labels by subdividing the point cloud, pre-processing the subdivisions, updating weights, and storing weights. Training a DNN includes obtaining a 3D point cloud, establishing a topology of the DNN, training the DNN to output point labels by subdividing, pre-processing the subdivisions, analyzing the features and respective labels of the point cloud to update DNN weights, and storing the weights. A server includes a processor and a memory storing instructions that, when executed by the processor, cause the server to obtain a 3D point cloud, establish a DNN topology, train the DNN to output labels by subdividing, pre-process the subdivisions, analyze the features and respective labels of the point cloud to update weights, and store the weights.

20 Claims, 13 Drawing Sheets

(56) References Cited

U.S. PATENT DOCUMENTS

| | | | | |
|---|---|---|---|---|
| 2017/0011091 | A1* | 1/2017 | Chehreghani | G06F 16/2455 |
| 2017/0053412 | A1* | 2/2017 | Shen | G06V 10/7788 |
| 2017/0116781 | A1* | 4/2017 | Babahajiani | G06T 15/506 |
| 2017/0272651 | A1* | 9/2017 | Mathy | G01S 17/894 |
| 2017/0304732 | A1* | 10/2017 | Velic | A63H 33/08 |
| 2017/0358087 | A1* | 12/2017 | Armeni | G06V 20/10 |
| 2019/0179332 | A1* | 6/2019 | Cheng | G05D 1/0246 |
| 2019/0192880 | A1* | 6/2019 | Hibbard | A61N 5/1039 |
| 2019/0279420 | A1* | 9/2019 | Moreno | G06V 20/64 |
| 2020/0084427 | A1* | 3/2020 | Sun | G06N 3/0454 |
| 2020/0184718 | A1* | 6/2020 | Chiu | G06T 7/20 |
| 2020/0234071 | A1* | 7/2020 | Yuvaraj | G06V 10/82 |
| 2020/0349246 | A1* | 11/2020 | Budman | G06F 21/32 |
| 2020/0393562 | A1* | 12/2020 | Staudinger | G01S 17/86 |
| 2021/0072391 | A1* | 3/2021 | Li | G06V 10/82 |
| 2021/0124901 | A1* | 4/2021 | Liu | G06T 7/74 |
| 2021/0150078 | A1* | 5/2021 | Ramanath | G06T 17/00 |
| 2021/0201476 | A1* | 7/2021 | Prasad | G06V 20/64 |
| 2022/0067943 | A1* | 3/2022 | Claessen | G06V 10/454 |
| 2022/0076802 | A1* | 3/2022 | Bondar | G16H 20/40 |

\* cited by examiner

PERFORMING SEMANTIC SEGMENTATION OF 3D DATA USING DEEP LEARNING

CROSS-REFERENCE TO RELATED APPLICATIONS

This application claims priority to U.S. Provisional Application No. 62/970,263, entitled "Performing Semantic Segmentation of 3D Data Using Deep Learning" and filed on Feb. 5, 2020, the entire disclosure of which is incorporated herein by reference.

FIELD OF THE DISCLOSURE

The present disclosure is generally directed to methods and systems for performing semantic segmentation of three-dimensional data using deep learning and, more particularly, to techniques for training and operating machine learning models to generate a semantically-segmented 3D point cloud.

BACKGROUND

Three-dimensional (3D) image data may include a plurality of points (e.g., a plurality of pixels) representing a physical object. The physical object may correspond to a real object, such as an existing structure/scene (e.g., a building, a park, etc.) or an imaginary object (e.g., a model a designer creates for modeling purposes). A point cloud is an example of such 3D image data. A point cloud is a collection of pixels corresponding to a scene/object, wherein each pixel may include one or more color value. The color value of each pixel may correspond to one or more raster value, one or more RGB-colorspace value, etc.

However, the respective color values of each pixel may only communicate color information and do not indicate to a viewer whether a given pixel corresponds to, for example, a blade of grass or a roof. Conventional tools may include means that allow a user to manually label each pixel, or even a group of pixels. However, in even a simple scene such labeling is laborious, repetitive, and time-consuming. Humans may experience labeling pixel-level data, because the data is granular and difficult to understand when the user views the data out of context (e.g., when magnified). Conventional techniques may have additional drawbacks as well.

BRIEF SUMMARY

The present embodiments relate to, inter alia, techniques for automatically identifying the meaning of 3D image data at a pixel level. In one aspect a deep artificial neural network for generating a semantically-segmented three-dimensional point cloud stored on a computer readable storage medium is manufactured by a process that may include (1) obtaining one or more training three-dimensional point clouds, wherein one or more features of the point clouds include a respective label; (2) establishing a topology of the deep artificial neural network, wherein the network topology includes an input layer and an output layer having a predetermined number of neurons; and/or (3) training the deep artificial neural network to output a set of point labels by, and for each of the training three-dimensional point clouds, (i) subdividing the each point cloud into a plurality of subdivisions; (ii) pre-processing the plurality of subdivisions; and/or (iii) analyzing the features and respective labels of the training three-dimensional point clouds to update a set of weights of the deep artificial neural network. The manufacture may further include storing the set of weights of the deep artificial neural network on the computer readable storage medium as parameters for initializing the deep artificial neural network. The process may include additional, less, or alternate actions, including those discussed elsewhere herein.

In another aspect a computer-implemented method for training a deep artificial neural network to generate a semantically-segmented three-dimensional point cloud may include, via one or more processors, (1) obtaining one or more training three-dimensional point clouds, wherein one or more features of the point clouds include a respective label; (2) establishing a topology of the deep artificial neural network, wherein the network topology includes an input layer and an output layer having a predetermined number of neurons; and/or (3) training the deep artificial neural network to output a set of point labels by, for each of the training three-dimensional point clouds: (i) subdividing the each point cloud into a plurality of subdivisions, (ii) pre-processing the plurality of subdivisions, and/or (iii) analyzing the features and respective labels of the training three-dimensional point clouds to update a set of weights of the deep artificial neural network. The method may further include storing the set of weights of the deep artificial neural network as parameters for initializing the deep artificial neural network. The method may include additional, less, or alternate actions, including those discussed elsewhere herein.

In another aspect, a computer system may include one or more processors and a memory storing instructions that, when executed by the one or more processors, cause the server to (1) obtain one or more training three-dimensional point clouds, wherein one or more features of the point clouds include a respective label; (2) establish a topology of the deep artificial neural network, wherein the network topology includes an input layer and an output layer having a predetermined number of neurons; (3) train the deep artificial neural network to output a set of point labels by, for each of the training three-dimensional point clouds: (i) subdividing the each point cloud into a plurality of subdivisions, (ii) pre-processing the plurality of subdivisions, and/or (iii) analyzing the features and respective labels of the training three-dimensional point clouds to update a set of weights of the deep artificial neural network. The memory may store further instructions that, when executed, cause the system to store the set of weights of the deep artificial neural network on the memory as parameters for initializing the deep artificial neural network. The instructions may direct additional, less, or alternate functionality, including that discussed elsewhere herein.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple Figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, computer-implemented methods and computer systems for performing semantic segmentation of three-dimensional data using deep learning and, more particularly, to techniques for training and operating one or more machine learning models to generate one or more semantically-segmented 3D point clouds.

In some embodiments, an input 3D point cloud may include pixel information, wherein each pixel may include, for example, one or more colorspace attributes (e.g., RGB) and positional coordinates in three dimensions (e.g., an X, Y, and Z coordinate). A machine learning (ML) model is trained by analyzing one or more labeled training 3D point clouds. The training 3D point clouds may associate some, or all, of the pixels within the 3D point cloud with a label/category (e.g., "tree," "building," "leaf," etc.). The ML model may be a deep learning model, in some embodiments.

The trained ML model may accept as input the 3D point cloud. The ML model may not have previously analyzed the 3D point cloud. The ML model may predict, based upon the prior training, a label/category/class for each pixel of the input 3D point cloud. The ML model may output a copy of the input 3D point cloud, or output the modified original, wherein the output may include a label/category associated with each pixel of the input point cloud. A subsequent process and/or user may use the category information in further analysis/modification of the input point cloud.

For example, a subsequent process may use the categorical information to remove all objects of a given type (e.g., "tree") from the input point cloud. In another example, a subsequent process may use the categorical information to count the number of objects (e.g., cars) within the point cloud. It should be appreciated that the uses for the category information may depend on the objectives of the user of the present techniques, and that many uses are envisioned.

Exemplary Computing Environment

Figure 1:
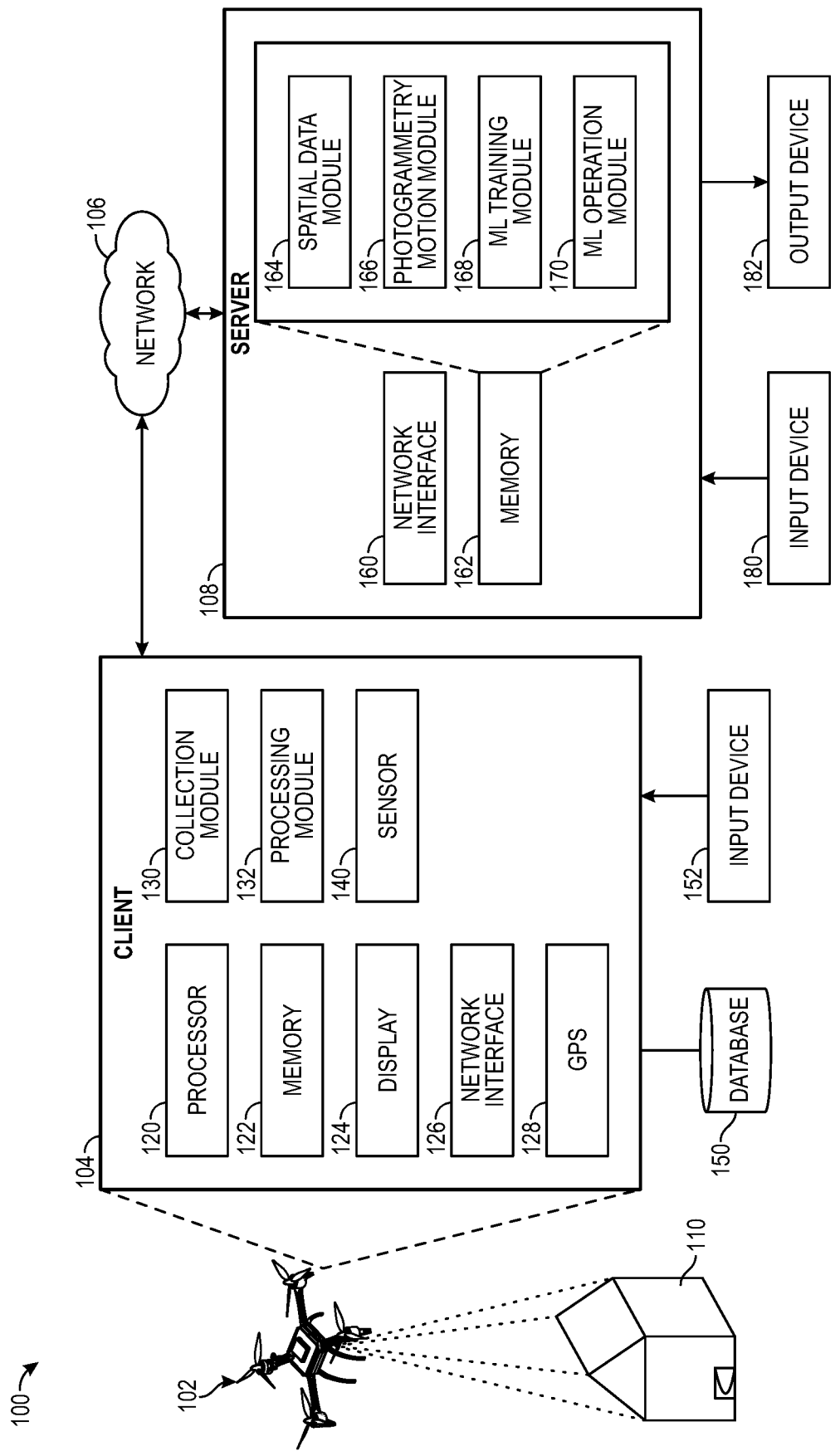
FIG. 1 depicts an exemplary computing environment in which techniques for performing semantic segmentation of three-dimensional data using deep learning may be implemented, according to one embodiment.

FIG. 1 depicts an exemplary environment 100 for implementing, inter alia, performing semantic segmentation of three-dimensional data using deep learning. The environment 100 may include an unmanned aerial vehicle (i.e., a drone) 102 in communication with a client computing system 104, a network 106, and a server 108. The drone 102 may capture image data of one or more structure 110, for example. In some embodiments, the structure 110 may be another object, of a different scale/size.

The drone 102 is remote from the server 108 and may be any suitable unmanned aerial vehicle. For example, the drone 102 may include a lightweight (e.g., Magnesium alloy) frame, one or more interchangeable cameras including 5.2K (or higher) video and supporting video codecs (e.g., CinemaDNG, ProRes, etc.). The drone 102 may include a high-speed camera, and other features such as obstacle detection/avoidance. The drone 102 may include landing gear. The one or more cameras of the drone may be rotatable. The drone 102 may be programmable and/or operator controlled, and may include a first person video pilot camera.

The drone 102 may be purchased as a commercial-off-the-shelf (COTS) product or custom built. In some embodiments, the present techniques may be utilized by an entity (e.g., a government/military) using proprietary drone 102 hardware that is not available for purchase by the general public. The drone 102 may capture 2D and/or 3D video data to a local storage device and/or stream the video data to another component of the environment 100, such as the server 108, via the network 106.

While FIG. 1 depicts only a single drone 102, the drone 102 may be in communication with numerous other drones similar to the drone 102, and/or a command drone, via the network 106 and/or other networks.

The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The client 104 may include hardware and software components implemented in one or more devices permanently and/or temporarily affixed to, or otherwise carried on or within, the drone 102. For example, some or all of the components of the 104 may be built into the drone 102 or affixed elsewhere within/on the drone 102 (e.g., via a USB or other data port of the drone 102). In one embodiment, a portion of the client 104 may be implemented using a mobile computing device (e.g., a smart phone of the user). The client 104 may include specialized hardware (e.g., one or more sensors) and computer-executable instructions for retrieving/receiving drone video data from the drone 102. In some cases, the client 104 may be implemented using components of the drone 102 and a mobile computing device. The client 104 may include a processor 120, a memory 122, a display 124, a network interface 126, and a global positioning system (GPS) unit 128. The processor 120 may be a single processor (e.g., a central processing unit (CPU)), or may include a set of processors (e.g., a CPU and a graphics processing unit (GPU)).

The memory 122 may be a computer-readable, non-transitory storage unit or device, or collection of units/devices, that may include persistent (e.g., hard disk) and/or non-persistent memory components. The memory 122 may store instructions that are executable on the processor 120 to perform various operations, including the instructions of various software applications and data generated and/or used by such applications. In the exemplary implementation of FIG. 1, the memory 122 stores at least a collection module 130 and a processing module 132.

Generally, the collection module 130 is executed by the processor 120 to facilitate collection of video data from the drone 102 and the processing module 132 is executed by the processor 120 to facilitate the bidirectional transmission of drone data (e.g., a still image, image metadata such as IMU, etc.) between the client 104 and the server 108 (e.g., sending drone data collected from the drone 102 to the server 108, receiving instructions related to the collection of data from the server 108, receiving/retrieving drone data, etc.).

The display 124 may include hardware, firmware and/or software configured to enable a user to interact with (i.e., both provide inputs to and perceive outputs of) the client 104. For example, the display 124 may include a touchscreen with both display and manual input capabilities. In some embodiments, the client system 104 may include multiple different implementations of the display 124 (e.g., a first display 124 associated with the drone 102 and a second display 124 associated with a mobile computing device of the user).

The network interface 126 may include hardware, firmware and/or software configured to enable the drone 102 and/or client 104 to wirelessly exchange electronic data with the server 108 via the network 106. For example, network interface 126 may include a cellular communication transceiver, a Wi-Fi transceiver, and/or transceivers for one or more other wireless communication technologies (e.g., 4G).

The GPS unit 128 may include hardware, firmware and/or software configured to enable the client 104 to self-locate using GPS technology (alone, or in combination with the services of server 108 and/or another server not shown in FIG. 1). Alternatively, or in addition, the client 104 may include a unit configured to self-locate, or configured to cooperate with a remote server or other device(s) to self-locate, using other, non-GPS technologies (e.g., IP-based geolocation).

In some embodiments, the collection module 130 (or other software stored in the memory 122) provides functionality for collecting drone data from the drone 102. Drone data may include one or more images captured from a capture device, GPS location data, or other metadata (e.g., IMU). The collection module 130 may include instructions for accessing a bus or API of the drone 102 to retrieve/receive the drone data. The collection module 130 may receive/retrieve the drone data in real time as the data is generated by the drone 102, in batches (e.g., periodically every N minutes or more frequently, wherein N is a positive integer) and/or at the end of a drone 102 flight session.

When the collection module 130 is integral to the drone 102, the collection module 130 may access the drone data via a wired connection. When the collection module is not integral to the drone but is integral to another component (e.g., a mobile device of the user), the collection module 130 may access the drone data via a wireless connection (e.g., Wi-Fi internet, Bluetooth, etc.).

Using the drone 102 advantageously allows the operator of the present techniques to fly ore frequently/and cost-effectively than manned aircraft/satellite imaging. For example, the imaging may be updated daily/weekly or, in some cases, more frequently. Moreover, data may be processed as it is captured by the drone, decreasing overall latency of the environment 100.

The processing module 132 provides functionality for processing drone data from the drone 102. The processing module 132 may retrieve/receive data from the collection module 132 and may transmit data to/from the database 136. The processing module 132 may transmit data to/from the server 108. The collection module 130 may collect data from one or more sensors and may store collected data in the database 150.

The drone 104 may further include a sensor 140, an electronic database 150, and an input/output device 152. The sensor 140 may include one or more sensors associated with the drone 102 (e.g., an airspeed sensor) and/or a mobile device of the user (e.g., an accelerometer). The sensor 140 may provide data (e.g., sensor readings) to applications (e.g., the collection module 130). Many types of sensors may be used, such as cameras, video cameras, and/or microphones. In some embodiments, sensors may read particular drone data.

The database 150 may be any suitable database (e.g., a structured query language (SQL) database, a flat file database, a key/value data store, etc.). The database 150 may include a plurality of database tables for storing data according to data storage schema. The database 150 may include relational linkages between tables, and may allow complex data types such as image blob data to be stored and queried.

The I/O device 152 may include hardware, firmware and/or software configured to enable a user to interact with (i.e., both provide inputs to and perceive outputs of) the client 104. For example, the display 124 may include a touchscreen with both display and manual input capabilities. In some embodiments, the I/O device 152 may include a keyboard, one or more speakers, a microphone, etc. Via the I/O device 152, the user may configure instructions that cause the client 104 to transmit drone data to the server 108 via the network 106.

In some embodiments, the I/O device 152 and/or another module may include instructions for sending/receiving remote control instructions from a user. For example, the user may use the drone 102 remote controller (not depicted) that is coupled to the drone wirelessly to navigate/pilot the drone 102, and/or to view live aerial video of the drone 102.

The server 108 may include a network interface 158, a processor 160, and a memory 162. The network interface 158 may include hardware, firmware and/or software configured to enable the server 108 to exchange electronic data with the telematics system 104 via network 106. For example, network interface 158 may include a wired or wireless router and a modem. The processor 160 may be a single processor (e.g., a central processing unit (CPU)), or may include a set of processors (e.g., a CPU and a graphics processing unit (GPU)).

The memory 162 is a computer-readable, non-transitory storage unit or device, or collection of such units/devices, that may include persistent (e.g., hard disk) and/or non-persistent memory components.

The memory may store one or more modules comprising sets of computer-executable instructions, such as a spatial data module 164, a photogrammetry motion module 166, a machine learning training module 168, and a machine learning operation module 170. The memory 162 may store data generated and/or used by the modules.

The spatial data module 164 may receive/retrieve data from the processing module 132 of the client 104. Specifically, the spatial data module 164 may receive/retrieve drone data (e.g., 2D images, 3D images, and image/drone metadata). The spatial data module 164 may store the received/retrieved data/metadata in the memory 162 and/or in another location (e.g., in an electronic database). The spatial data module 164 may include instructions for associating video data with other data (e.g., metadata). For example, the spatial data module 164 may associate one or more image with a respective GPS location and/or IMU information received from the client 104. The spatial data module 164 may provide data to the photogrammetry motion module 166.

The photogrammetry motion module 166 may include instructions for generating 3D point clouds from 2D image data. The photogrammetry motion module 166 may be used to generate a 3D model using 2D drone data captured by an image capture device of the drone 102. Once the drone 102 has captured several images corresponding to a scene, the photogrammetry motion module 166 may generate a 3D point cloud corresponding to the scene by analyzing the 2D drone data. The 3D point cloud may be stored in an electronic database, wherein the 3D point cloud is usable by other modules (e.g., the ML training module 168) for various purposes.

The ML training module 168 may be generally configured to load, create, train, and/or store ML models for use by the server 108 and/or the client 104. For example, the ML training module 168 may include instructions for training a deep learning artificial neural network ML model by analyzing labeled 3D point clouds, as described below. Specifically, the ML training module 168 may train a deep learning model to categorize each pixel of an input 3D point cloud. The ML training module 168 may analyze 3D point clouds generated by the photogrammetry motion module 166 as training data in some embodiments. The ML training module 168 may train the deep learning ML model using 3D point clouds generated via photogrammetric methods, and/or other 3D point clouds. Each pixel of the 3D point clouds used for training may be associated with a label.

For example, pixel labels/categories may include "Ground," "Pavement," "Building," "Man-made object," "Low vegetation," "Medium vegetation," "High vegetation," etc. A user may label ground truth (i.e., training) 3D point clouds using a 3D point cloud tool by, for example, encircling objects and then selecting a label from a pre-determined list, and/or by typing the name a new label (e.g., via the input device 152 of FIG. 1). In some embodiments, the classes used for labeling may be based upon standard classifications (e.g., a LAS LIDAR standard).

In some embodiments, labeled data used for training may include a point cloud having spatial (e.g., XYZ) and color-space (e.g., RGB) values, wherein the user has manually cut around objects of interest (e.g., a 3D polygonal volume) and assigned a scalar to the volumes. For example, some scalar labels are: "Building=>0, Tree=>1." The labeled data may be split into training and testing data sets, having for example, a 5:2 ratio. However, the ML model does not classify based upon volumes, but rather, classifies point-by-point.

In some embodiments, only categories relevant to a particular use case may be chosen. It should also be appreciated that in some embodiments, as few as one class may be used, such as in outlier detection use cases. For example, a ML model may be trained to generate an outlier label when an output is determined by the trained model to be outside of a normal/reasonable bound. In such cases, the model may be trained as a one-class Support Vector Machine (SVM), wherein the distance of each point is fitted to a hyperplane, and the distance of each point to the hyperplane is analyzed as a proxy to the outlier.

Semantic segmentation in three dimensions presents challenges, because any two visually adjacent pixels within a point cloud may not be adjacent in memory/storage. Further, the volume of points a 3D image are not stored in a volumetric data structure. Moreover, in a sparse 3D image, a 3×3×3 area (for example) may have 0 points. Such non-uniform density may depend upon the shape within the volume.

The ML training module 168 may retrieve/receive a data set including one or more 3D point cloud corresponding to a physical scene. The ML training module 168 may use as ground truth data the 3D point cloud including the respective pixel labels. In some embodiments, the ML training module 168 may subdivide training scenes into columnar subdivisions, as discussed below.

In general, the ML training module 168 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. For example, a deep learning ANN may be trained using point clouds to generalize about previously unseen point clouds.

The ML operation module 170 may load a model (e.g., a deep learning model) trained by the ML training module 168 from the memory 162 or another location. For example, the ML operation module 170 may load a trained ML model and pass a series of parameters (e.g., a 3D point cloud). The ML operation module 170 may receive from the trained deep learning model a copy of the 3D point cloud wherein each pixel may include a category/class label. The generated 3D point cloud including the respective pixel labels may be stored in the memory of the server 162 or in another location (e.g., in an electronic database of the server 108).

The server 180 further may include an input device 180 and an output device 182. The input device 180 may include hardware, firmware and/or software configured to enable a user to interact with (i.e., provide inputs to) the server 108. The output device 182 may include hardware, firmware and/or software configured to enable a user to interact with (i.e., provide inputs to) the server 108. By using the input device 180 and the output device 182, the user may configure the modules of the server 108, inspect data stored in the memory 162 of the server 180, and perform other operations.

In operation, a user may cause the drone 102 to overfly a scene. The drone 102 may follow a pre-determined flight path programmed into the memory 122 of the drone 102 and/or may be piloted remotely by the user. For example, the user may override the pre-programmed drone 102 flight path. The collection module 130 of the drone 102 may capture images of the scene according to a pre-determined logic/time interval, and/or at the initiation of the user (e.g., via the remote control). The collection module 130 may capture 2D images. The processing module 132 may transmit the captured 2D images and/or additional data respective to each image (e.g., GPS coordinates, metadata, etc.) immediately, or after a delay, to the server 108 via the network 106.

The spatial data module 164 may receive the images and/or data. The spatial data module 164 may associate the images and/or data by, for example, adding a sequential identifier to each image. The spatial data module 164 may store the images in an electronic database such that the sequential orientation is preserved. In some embodiments, the spatial data module 164 may analyze the 2D images and reject/discard those for which no metadata is available, or those which are corrupted/blank or blurred.

Once the spatial data module 164 has stored the images, the photogrammetry motion module 166 may analyze the images to generate a 3D point cloud. The photogrammetry motion module 166 may utilize structure-from-motion techniques to plot points in the 3D point cloud from overlapping points within multiple of the 2D images stored by the spatial data module 164. The spatial data module 164 may preprocess input for the ML models, as discussed below in further detail with respect to FIGS. 7A-7G.

The photogrammetry motion module 166 may store the generated 3D point cloud in the electronic database, optionally in association with the plurality of 2D images used to generate the 3D point cloud. A user may rotate the generated 3D point cloud and view the point cloud in 3D space. Each point in the point cloud may include a 3D coordinate value (e.g., X,Y,Z) and an R,G,B color value taken from the images used to create the tie points.

Once the 3D point cloud is generated, the ML operation module 170 may analyze the 3D point cloud using an ML model trained by the ML training module 168 to identify/categorize each pixel within the point cloud.

In some embodiments, no structure-from-motion techniques are used, such as when the present techniques are used to analyze a 3D point cloud received from/generated by a third party.

Model training and topology are described further below. In general, the ML training module 168 may use 3D point cloud training data by dividing a scene, and processing each division individually.

Exemplary Scene Capture

Figure 2A:
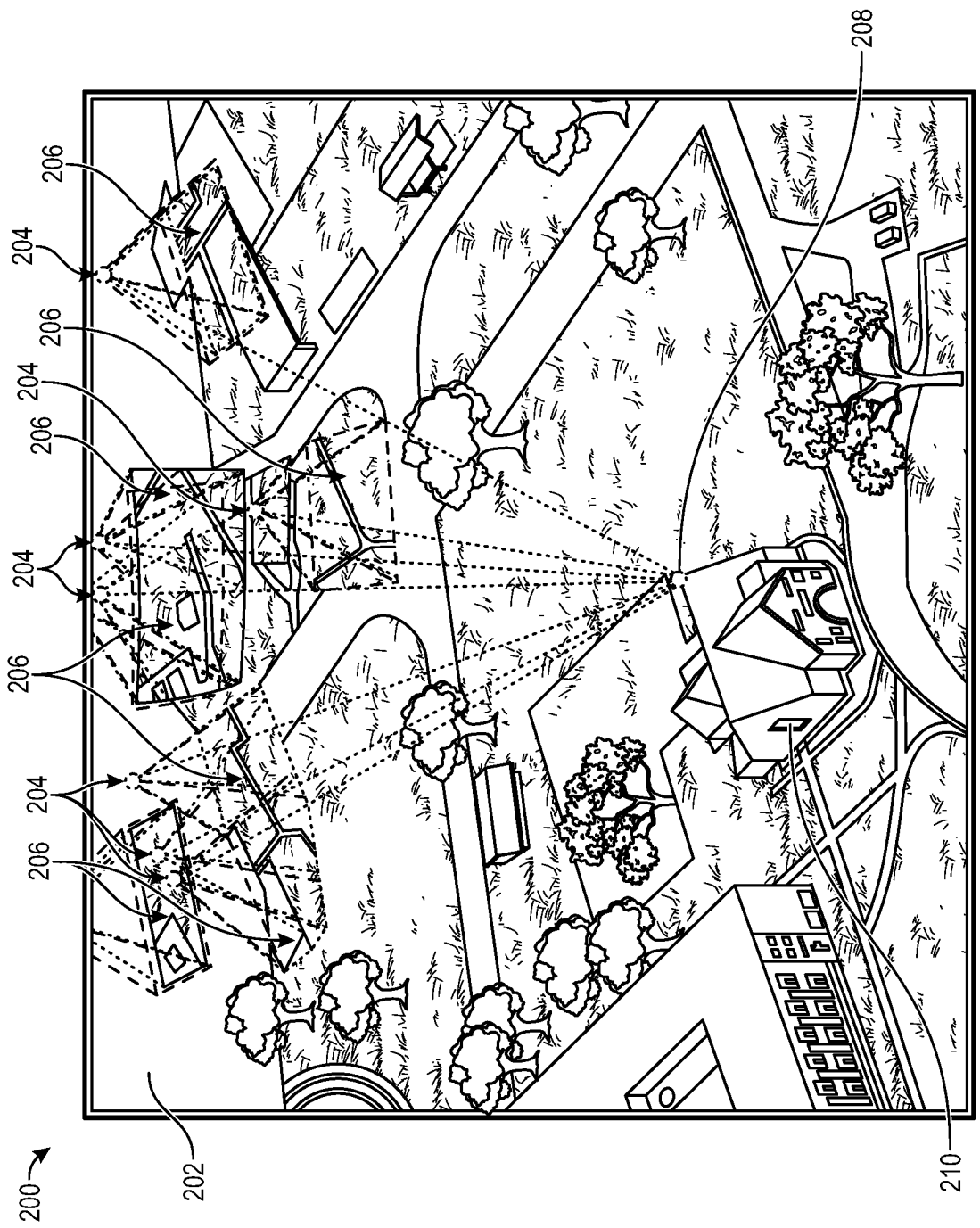
FIG. 2A depicts an environment including a 3D scene constructed by performing structure-from-motion techniques, according to one embodiment.

FIG. 2A depicts an exemplary environment 200 including a 3D scene 202 constructed by performing structure-from-motion techniques. The scene 202 may include one or more of capture locations 204, and one or more respective planar images 206, wherein each of the respective planar images 206 corresponds to one of the capture locations 204. Each of the capture locations 204 may correspond to a tie point 208. Each of the capture locations 204 may correspond to a capture device of a flight device (e.g., a camera of a drone, such as the drone 102). The tie point 208 is a single recognizable feature of a structure 210 that each of the flight devices at each of the capture locations 204 have a vantage of. For example, the tie point 208 may correspond to a single feature of the structure 110 or the structure 210, such as a church steeple.

It should be appreciated that the tie point may correspond to any pixel or collection of pixels that the planar images 206 commonly include. In one embodiment, a capture device at a location 204 may not have a clear view of the tie point 208. In that case, the photogrammetry motion module 166 may analyze the planar image 206 and discard the planar image 206 generated by the capture device. Each respective capture location 204 may include a line connecting the capture location 204 to the tie point 208 and additional lines of sight connecting the capture location 204 to the edges of a planar image 206. The lines of sight of each capture location 204 may depict a visualization of where the capture device was located when it captured the planar image 206 corresponding to the structure 210.

In certain embodiments wherein point clouds are generated using structure-from-motion techniques, the photogrammetry motion module 166 may analyze the planar images 206 to generate a point cloud. Lines of sight are further discussed with respect to FIG. 4, below.

In the example of FIG. 2A, the steeple of the structure 210 is the tie point 208. The photogrammetry motion module 166 may include instructions for determining as many tie points 208 (e.g., trees, people, buildings, etc.) as possible from multiple images. For example, a point A and a point B may be visible in a first planar image 206 and a second planar image 206, but appear in the respective planar images 206 to be of different perspective, due to differing locations of the respective capture devices used to capture the planar images 206.

The photogrammetry motion module may include instructions for extrapolate the connections between the point A and the point B and other points many times (e.g., hundreds of thousands/millions) to construct a collection of points observed from multiple perspectives. The photogrammetry motion module 166 may determine the source of change relative to one another of the points A and B, and save the source of change as the 3D space the points lie in. Once enough images are captured, the photogrammetry motion module 166 may find multiple tie points 208, allowing triangulation of pixels per image in a 3D space/environment from 2D images (i.e., a 3D point cloud).

The photogrammetry motion module 166 may include instructions for tagging the 3D point cloud with additional image data for increasing density of the 3D point cloud. The photogrammetry motion module 166 may tag each 3D point in the 3D point cloud with geospatial metadata (X,Y,Z) and one or more scalar values (e.g., color or other metadata). For example, enhanced GPS (e.g., 2.5 cm accuracy) data may be collected by the drone and added to the 3D point cloud. Data from the drone 102 inertial measurement unit (IMU) may also be collected. The present techniques advantageously allow analysts to attain 3D spatial awareness (e.g., elevation) by building a 3D scene including x,y,z and color values at each respective coordinate from 2D images.

Figure 2B:
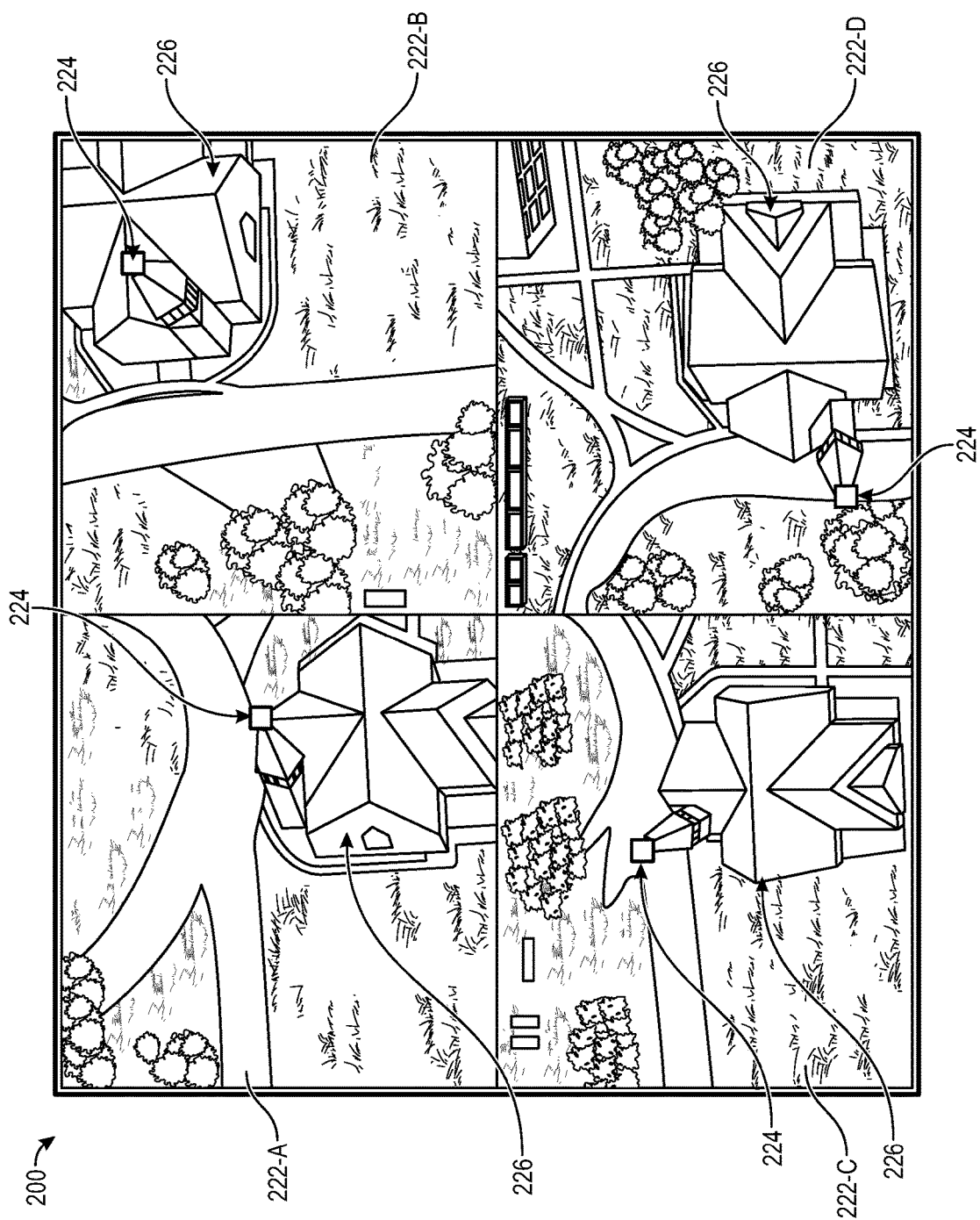
FIG. 2B depicts an environment including a plurality of scenes corresponding to the scene of FIG. 2A, according to one embodiment.

FIG. 2B depicts an exemplary environment 200 including scenes 222-A-222-D, wherein each of the scenes 222-A through 222-D may correspond to the scene 202. For example, the scenes 222-A through 222-D include a respective tie point 224 that corresponds to the tie point 208, and a respective structure 226 that corresponds to the structure 210 of FIG. 2A and the structure 110 of FIG. 1, for example.

The capture device (e.g., the drone 102 of FIG. 1) may include instructions for capturing (or may be controlled/programmed to capture) images of the scene 202 from a perspective that is perpendicular to the ground (i.e., straight down), as depicted in FIG. 2B. The capture device may include overlap between the scenes 222-A through 222-D, such that one or more points (i.e., tie points) are captured in multiple images.

Exemplary Deep Learning Artificial Neural Network

Figure 3:
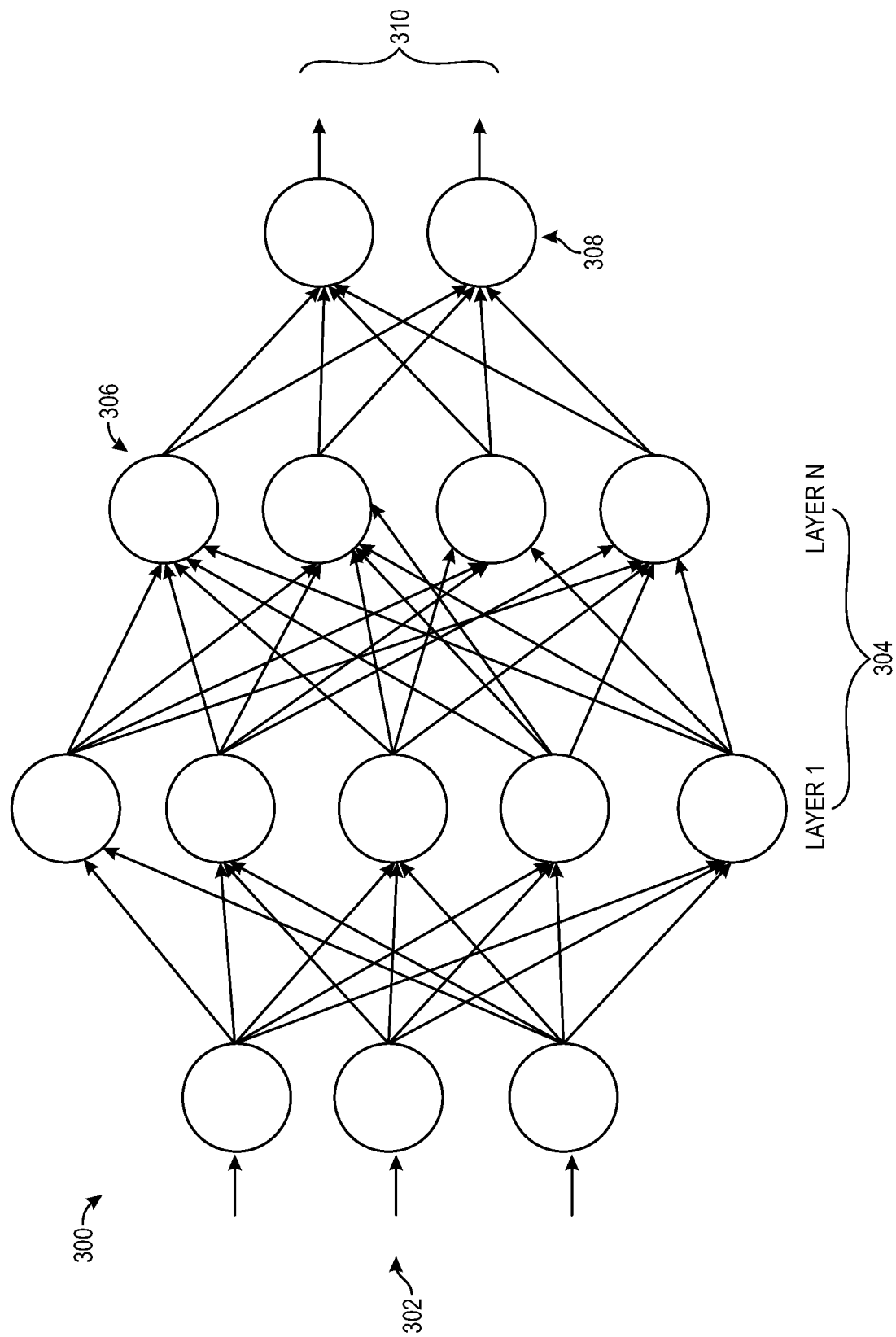
FIG. 3 depicts an exemplary deep learning artificial neural network, according to one embodiment.

FIG. 3 depicts an exemplary deep learning artificial neural network (DNN) 300. The DNN 300 may be trained by the ML training module 168 of FIG. 1, for example. The DNN 300 may be operated by the ML operation module 170 of FIG. 1, for example. The DNN 300 may include a plurality of layers, each of which include any number of respective neurons, or nodes. The DNN 300 may include an input layer 302, one or more hidden layers 304, and an output layer 308.

Each of the layers in the DNN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of DNNs are possible.

The input layer 302 may correspond to a large number of input parameters (e.g., one million inputs), in some embodiments, and may be analyzed serially or in parallel. Further, various neurons and/or neuron connections within the DNN may be initialized with any number of weights and/or other training parameters. Each of the neurons in the hidden layers 304 may analyze one or more of the input parameters from the input layer 302, and/or one or more outputs from a previous one or more of the hidden layers 304, to generate a decision 310 or other output. The output layer 308 may generate the decision 310 or more outputs, each indicating a prediction or an expected value. The number of input neurons may be stored as a predetermined value, and used to initialize a network for training.

In some embodiments and/or scenarios, the output layer 308 may include only a single output 310. For example, a neuron may correspond to one of the neurons in a hidden layer 306. Each of the inputs to the neuron may be weighted according to a set of weights W1 through Wi, determined during the training process (for example, if the neural network is a recurrent neural network) and then applied to a node that performs an operation a. The operation a may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a previous/subsequent layer or as an output 310 of the DNN. In some embodiments, the DNN may include one or more convolutional neural network (CNN) layers. The output layer 308 may be a set of downsampled/upsampled points, as described below, wherein each point may include a class probability.

Exemplary Photogrammetry Environment

Figure 4:
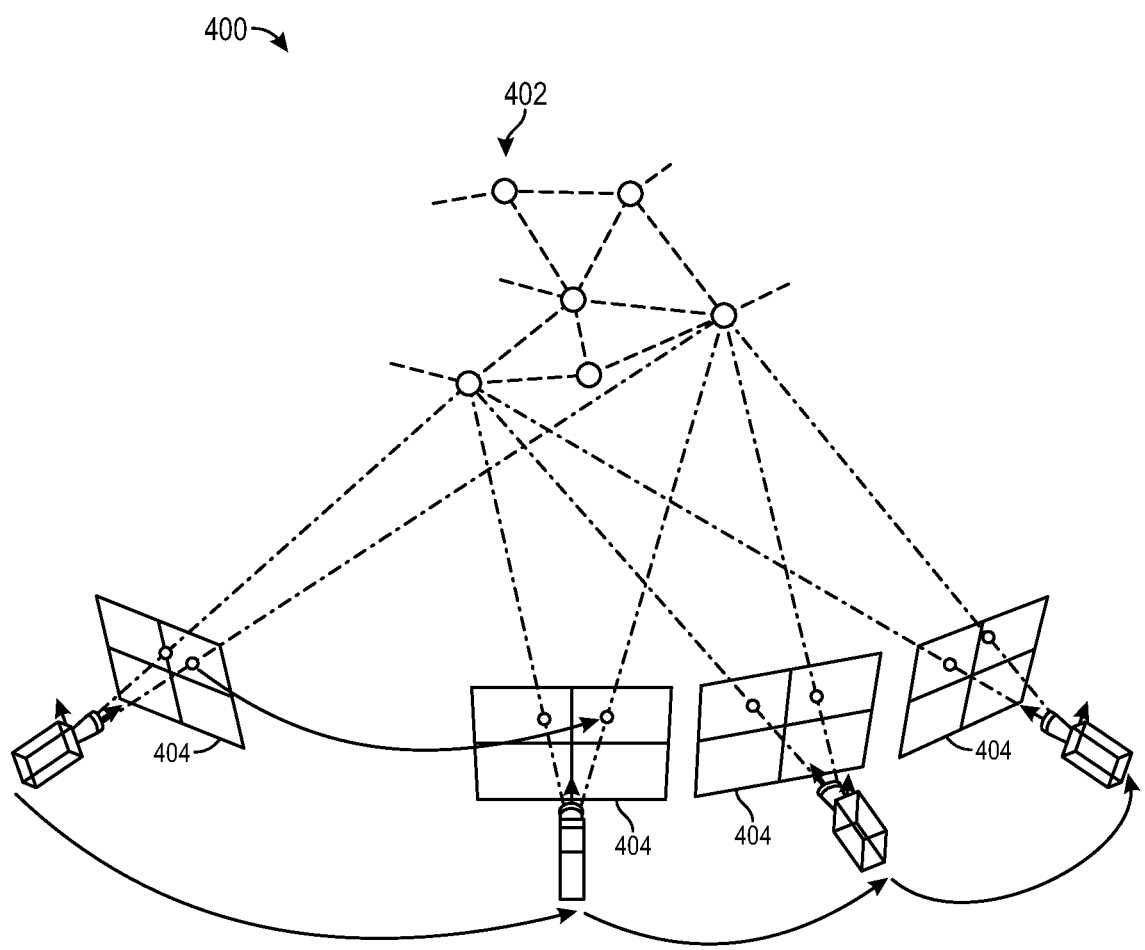
FIG. 4 depicts an exemplary photogrammetry environment, according to one embodiment.

FIG. 4 depicts an exemplary photogrammetry environment 400. The photogrammetry environment 400 may include a 3D model 402, constructed by a series of planar images 404 being captured by a capture device (e.g., a camera of the drone 102 of FIG. 1). Each of the planar images 404 may correspond, for example, to the planar images 206 of FIG. 2A. The 3D model 402 may correspond to the point cloud of the 3D scene 202 of FIG. 2A. FIG. 4 depicts corresponding feature points of each planar image 206, which may correspond to the tie points 208 of FIG. 2A.

Figure 5:
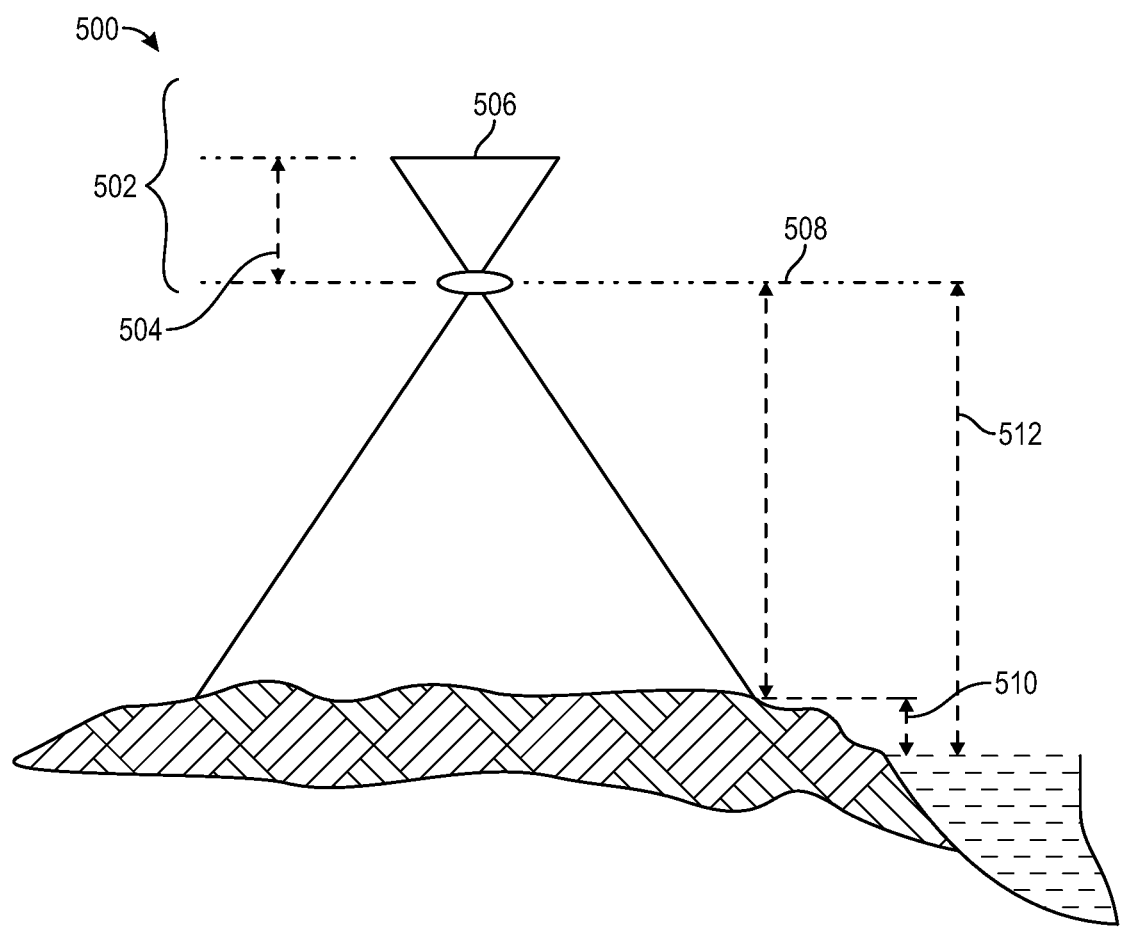
FIG. 5 depicts an exemplary photogrammetry environment, according to one embodiment.

FIG. 5 depicts an exemplary photogrammetry environment 500. The photogrammetry environment 500 may include a capture device 502. For example, the capture device may be onboard the drone 102 of FIG. 1. The capture device 502 may include a focal length and focal plane as determined by a lens 504. The lens 504 may be located a distance 508 above terrain (e.g., the ground, sea level, etc.). The distance above terrain 508 may be measured as a distance 512 measured relative to sea level 510. The scale of the image captured using the photogrammetry environment 500 may be calculated by computing the ratio of the focal length of the lens 504 of the camera 502 to the height above terrain 508.

Exemplary Training Data

Figure 6:
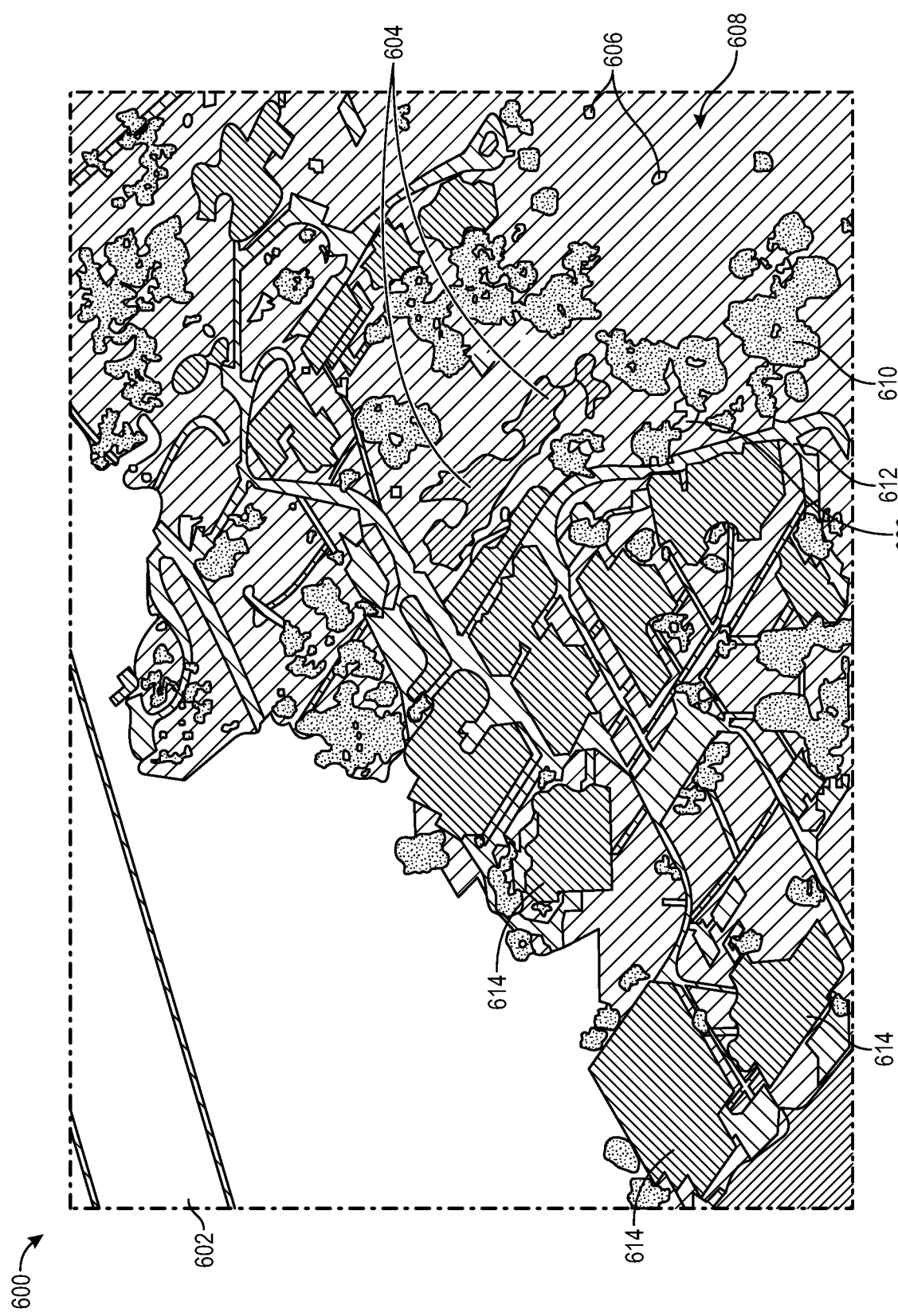
FIG. 6 depicts an exemplary 3D scene having labeled segments, according to one embodiment.

FIG. 6 depicts exemplary training data 600 including a plurality of labeled segments. For example, the ML training module 168 of FIG. 1 may analyze the training data 600 for training the DNN 300 of FIG. 3. The training data 600 may be a point cloud, in some embodiments. In some embodiments, the training data 600 may be generated using structure-from-motion techniques as discussed above.

The training data 600 may include a first segment 602. The first segment 602 may correspond to a first label, such as "road," for example. The training data 600 may include a second segment 604 that corresponds to a label such as "lake." The training data 600 may include further segments 608-604, each corresponding, respectively, to a different categorical feature, or segment, of the training data 600. The ML training module 168 may analyze the segments and respective labels of the training data 600 to predict labels for segments contained in point clouds not used for training. The ML training module 168 may use many (e.g., one hundred or more) additional training data 600 for training ML models, in some embodiments.

Exemplary 3D Point Cloud Pre-Processing

Figure 7A:
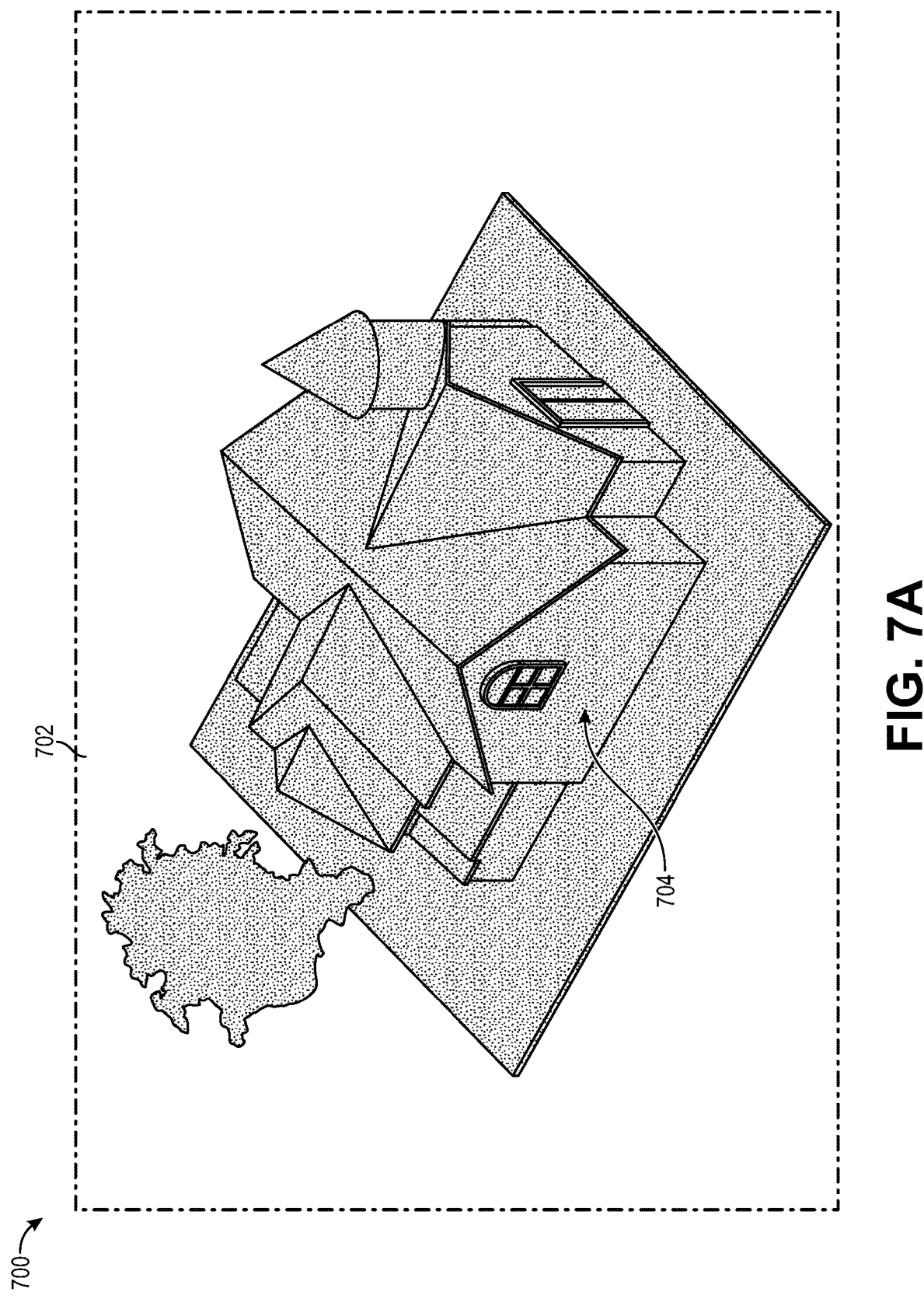
FIG. 7A depicts an exemplary scene including a point cloud, according to one embodiment.

FIG. 7A depicts an exemplary scene 700 including a point cloud 702. The point cloud 702 may include an object 704, that may correspond to the structure 110 of FIG. 1, in some embodiments. In some embodiments, the object 704 may be a non-structure (e.g., an abstract geometric or other mathematical shape, or any other aspect of a scene). A user may rotate the point cloud 702 within the environment 700.

Figure 7B:
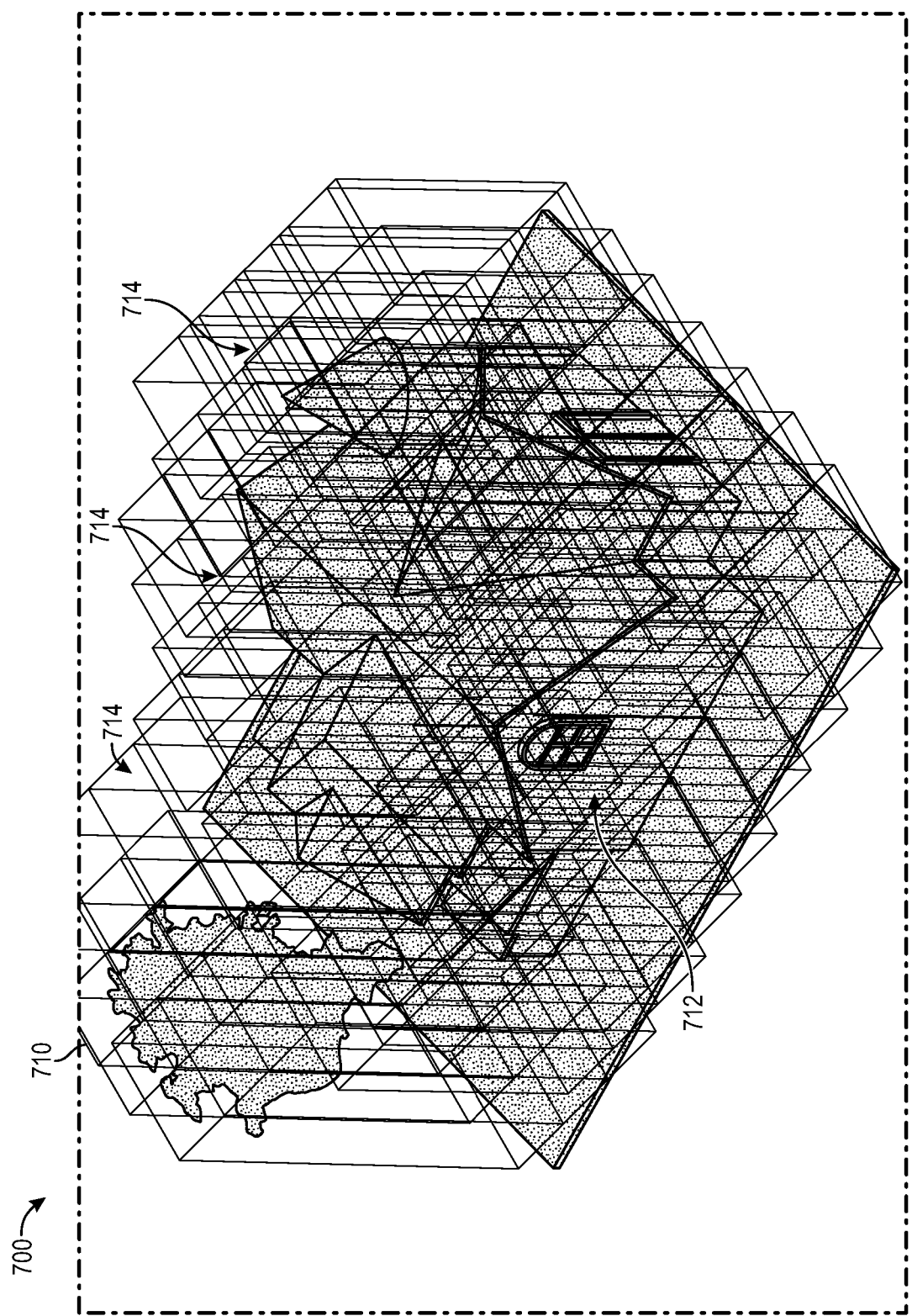
FIG. 7B depicts an exemplary scene including a point cloud that may correspond to the point cloud of FIG. 7A, according to one embodiment.

FIG. 7B depicts an exemplary scene 700 including a point cloud 710. The point cloud 710 may correspond to the point cloud 702, in some embodiments. The point cloud 710 may include an object 712, that may correspond to the structure 704 of FIG. 7A, in some embodiments. FIG. 7B further may include a plurality of subdivisions 714, representing subdividing the point cloud 710 by the spatial data module 164 of FIG. 1, for example. The depicted subdivisions 714 are columnar in shape, but in some embodiments, other shapes may be used to subdivide the point cloud 710.

Segmentation of 3D point clouds may refer to the process by which objects in a 3D point cloud are assigned an identifier (i.e., labeled, tagged, categorized, etc.). Segmentation of 3D point clouds presents difficulties that are addressed by the present techniques. In particular, a deep learning artificial neural network such as the DNN 300 of FIG. 3 may have a fixed input and/or output size, as shown by the input layer 302. Therefore, the input provided to the trained ML model during training and operation must be of a uniform size. However, a 3D scene such as a point cloud may include objects of varying density and/or size. To reconcile this mismatch, the pre-processing may include a subdivision (e.g., column-wise) of the scene 700 as shown in FIG. 7B.

The pre-processing performed by the spatial data module 164 allows the ML operation module 170, for example, to input a constant number of points to the trained ML models and to retrieve predictions from the trained model for each of the columns individually using unique encodings. Specifically, the memory 162 may include an input size parameter governing the number of input neurons in the input layer of the trained ML module. The stored parameter may be used by the modules of the environment 100 to maintain consistency of inputs to ML models during training and operation, in some embodiments.

The subdivisions 714 may be of a fixed physical size (e.g., 4 meters×4 meters) and/or may have a stride, or a number representing an absolute offset for each subdivision from an edge of the 3D point cloud. The subdivisions may overlap, in some embodiments. Selecting an overlap in a vertical or horizontal dimension may improve spatial awareness of the ML analysis, because the same point may be included in several (e.g., four or more) different subdivisions 714, such that each subdivision 714 may include information from its neighboring subdivision 714.

As noted, subdividing the 3D point cloud may result in subdivisions 714 of differing size. Therefore, the spatial data module 164 may normalize the size of each subdivision 714. Specifically, the spatial data module 164 may count the total number of points (e.g., pixels) within each column, and construct an overall distribution of the number of points across each subdivision 714. Pre-processing may include upsampling, downsampling, and/or normalization procedures.

Exemplary Upsampling and Downsampling

The spatial data module 164 may select a maximum number of points M within the distribution (e.g., 4096 points), wherein the maximum number M may be a power of two. The spatial data module 164 may analyze each subdivision 714 and compare the number of points to the maximum M. When there are more points within the subdivision 714, the spatial data module 164 may downsample the subdivision 714, wherein the downsampling may include randomly selecting M points to keep, removing all others from the subdivision 714 or otherwise marking them as inactive, or marking the M points as active points.

When there are fewer points within the subdivision 714 than M, the spatial data module 164, for example, may select a point at random within the subdivision 714 and duplicate the point, repeating the random selection and duplication process until the subdivision 714 contains at least M points.

The upsampling or downsampling processes are repeated with respect to each subdivision 714 until each subdivision 714 may include exactly M points. The resulting subdivision 714 containing M points may then be received as input by a DNN whose input layer expects M (or, e.g., M+1) inputs.

Figure 7C:
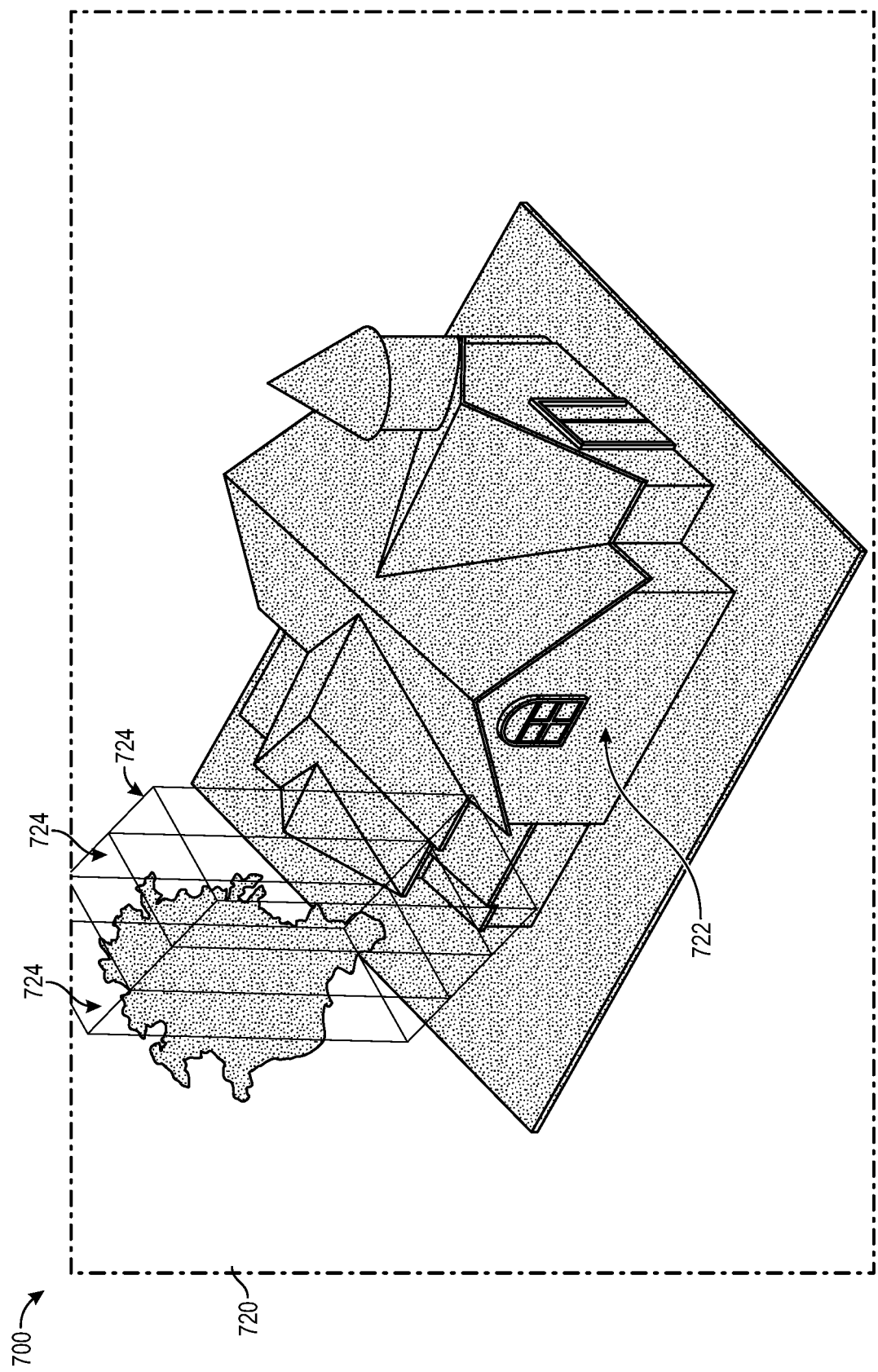
FIG. 7C depicts an exemplary scene including a point cloud that may correspond to the point cloud of FIG. 7B, according to one embodiment.

FIG. 7C depicts an exemplary scene 700 including a point cloud 720. The point cloud 720 may correspond to the point cloud 710, in some embodiments. The point cloud 720 may include an object 722, that may correspond to the structure 704 of FIG. 7A, in some embodiments. FIG. 7C further may include a plurality of subdivisions 724, representing subdividing the point cloud 710 by the spatial data module 164. The spatial data module 164 may tune the value of M based upon the density of the point cloud 720, in some embodiments. The spatial data module 164 may also vary the width of the subdivisions 724 and their overlap. In some embodiments, the value M may be selected from, for example, the 25 or 75 percentile of the distribution of number of points within the respective subdivisions 724. The spatial data module 164 may introduce randomness into the upsampling and/or downsampling to avoid introducing bias.

Exemplary Spatial Normalization

Each of the points of a point cloud may include one or more spatial coordinates (e.g., X, Y, and Z) as well as one or more color values/intensities (e.g., R, G, and B values). The spatial data module 164 may normalize spatial coordinates by aligning the coordinates relative to the center (i.e., origin) of a subdivision 714. A reason for performing an alignment is to adjust for terrain differences, such as change in slope across multiple subdivisions 714. Advantageously, by normalizing a value (e.g., the Z coordinate value), the present techniques allow the model to consider, for example, elevation information in addition to color information. For example, a 3D scene may include a sloping hill having a green tree at the bottom of the hill and green grass at the top of the hill.

When the subdivisions 714 are not normalized in Z, the DNN model (for example) may struggle to learn during training to identify/categorize the leaves and grass as corresponding to distinct items. However, by adjusting the values for the difference in height by normalizing Z, the model is better able to learn that the grass and leaves are distinct items, by preventing the model from learning that a heavy green color and given Z value refer to ground in one case and vegetation in another case. By re-centering the origin of the points, the ground layer will be at the origin Z-value (e.g., 0), and the edge of tree will be re-centered at a higher Z-value (e.g., 5). In general, the normalization procedure may force Z-value differentiation, which is especially advantageous when training with and/or analyzing large 3D point clouds that include different terrains.

The pre-processing steps disclosed herein allow massive data sets to be analyzed, and for parallel computing to drastically speed up the analysis. For example, a point cloud corresponding to a large (e.g., 70+ acre) facility can be transformed as above and fed into a trained ML model point by point for prediction, and then reassembled into a point cloud. The massively parallel approach allows very large outdoor scenes to be processed, which are not controlled scenes, such as indoor scenes, or vector surfaces (e.g., CAD) that lack noise.

Z-value normalization may further advantageously allow the trained ML models to function in a way that is elevation-agnostic. For example, the ML module 168 may train the ML model as discussed above using 3D point clouds corresponding to a first geographic location. Without Z-value normalization, the trained model may fail when presented with a new 3D point cloud of a scene at a different elevation, even if the new 3D point cloud corresponds to terrain that is similar to the terrain used for training the ML model. By normalizing the Z values, the trained model is broadly applicable beyond the training region.

Exemplary Unit Sphere Projection

In addition to upsampling, downsampling and/or normalizing the points within each subdivision of the 3D point cloud, the present techniques may collapse all of the points (e.g., pixels) within each subdivision of the 3D point cloud onto the surface of a sphere centered vertically and horizontally within each respective subdivision.

Figure 7D:
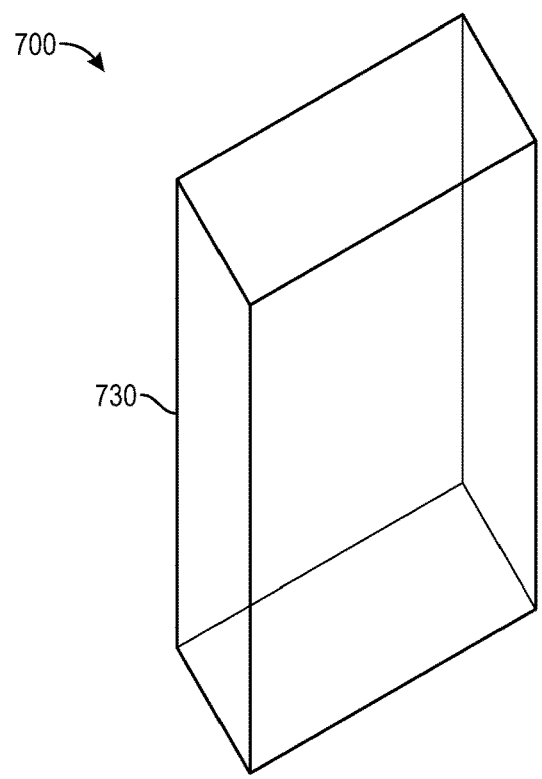
FIG. 7D depicts an exemplary subdivision that may correspond to one of the subdivisions of FIG. 7C or one of the subdivisions of FIG. 7B, according to one embodiment.
Figure 7E:
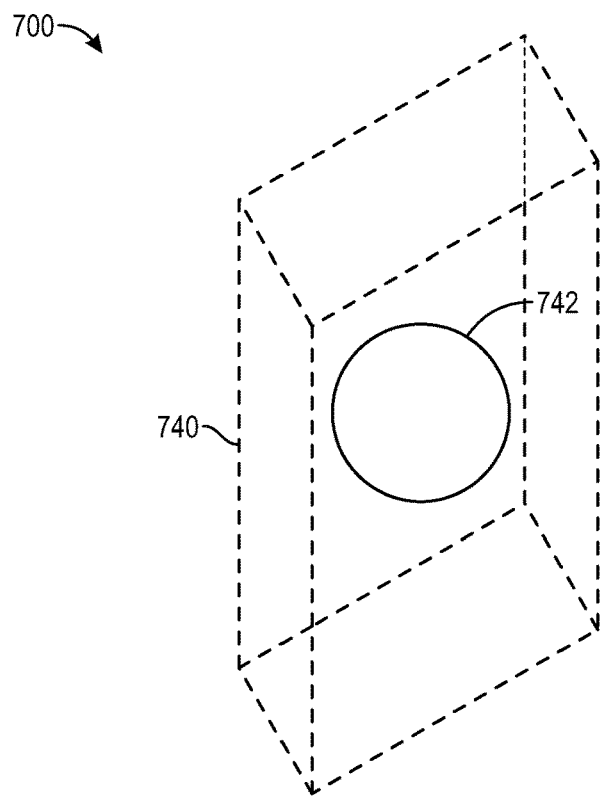
FIG. 7E depicts an exemplary sphere centered at a subdivision, according to one embodiment.
Figure 7F:
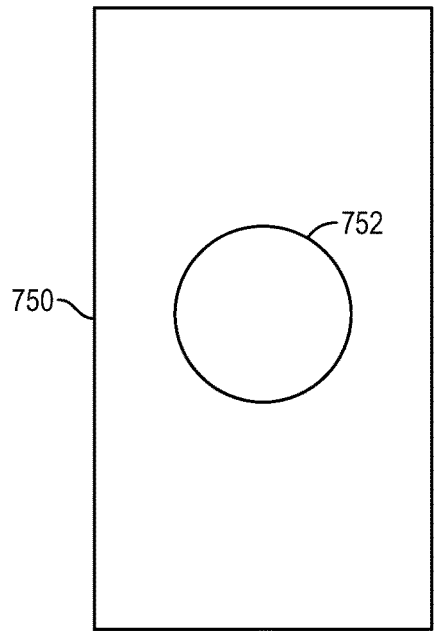
FIG. 7F depicts an exemplary sphere centered at a subdivision, according to one embodiment.

FIG. 7D depicts an exemplary subdivision 730 that may correspond to one of the subdivisions 724 of FIG. 7C or one of the subdivisions 714 of FIG. 7B, for example. FIG. 7E depicts an example of centering a sphere 742 at the center of the subdivision 730 of FIG. 7D. FIG. 7F depicts an example of centering a sphere 752, that may correspond to the sphere 742 at the center of the subdivision of a subdivision 750, that may correspond to the subdivision 730.

Figure 7G:
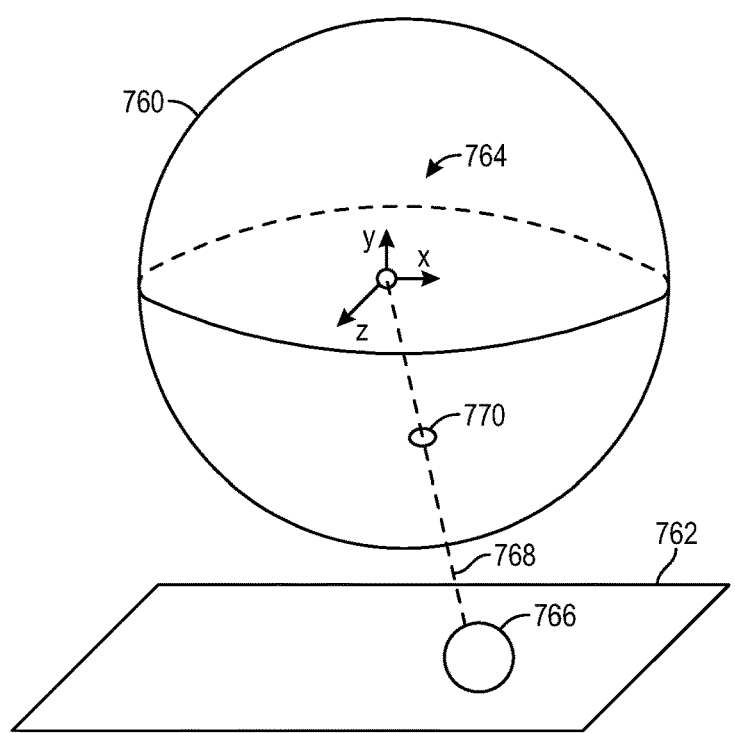
FIG. 7G depicts an exemplary sphere centered at a subdivision, according to one embodiment.

FIG. 7G depicts a sphere 760 that may correspond to the sphere 742 and the sphere 752. The sphere 760 may include an origin 764, representing the very center of the subdivision in which the sphere 760 resides. In some embodiments, the radius of the sphere 760 is equal to one. The spatial data module 164 may draw a line 768 from the origin 764 to one of the M points 766 within the subdivision 762. An intersection point 770 where the line intersects the sphere 760 may be a surface point 770 of the M point 766. The spatial data module 164 may repeat the process of mapping such intersection points for each of the remaining M−1 points within each subdivision of the 3D scene.

Once all M points are projected onto the surface of the sphere 760, the spatial data module 164 each point is a distance of one from the origin 764. Thus, the distance of any given point in M from the origin 764 is removed as a potential factor, and any such distance cannot influence an ML model during training or operation. Specifically, the ML models may analyze positional/coordinate information (e.g., X, Y, and Z); colorspace values (e.g., RGB); and normalized positional/coordinate information (e.g., projected X, Y, and Z) information. The normalized positional information causes the ML model to analyze direction and not magnitude of distance. Each pre-processed subdivision may be analyzed by a trained ML model to associate each pixel within the subdivision with a class that the trained ML is trained to predict.

Once the present techniques have been used to process the M points of the subdivision 762 each point may include a value, at each point, reflecting the probability of the point belonging to every potential class. For example, if the ML model is trained using seven potential classes, then each point may include an output vector of size seven, wherein each value in the vector corresponds to a probability of the point corresponding to each respective class, and wherein the seven values sum to one. For each of the M points, the spatial data module 164 may select the arg max of the vector (i.e., the class having the highest probability) and assign (e.g., in memory 162, database 150, etc.) the arg max as the type for the point. The result is M points each having a respective category/label. In one embodiment, the ML model outputs a single class name and/or probability.

The spatial data module 164 may integrate the point labels into the starting set of points. In some embodiments, integrating the labels may include the spatial data module 164 performing a pairwise distance calculation with respect to each original point, wherein for each of the original points in the subdivision 762, the spatial data module 164 locates the spatially closest pairwise point and assigns the respective category of the closest point to the original point. Continuing the above example, for M of the points, the distance is zero, and the class assigned will be that of the downsampled or upsampled point. For the points in the subdivision that are not in M, the class of the spatially closest point is chosen. The pairwise calculation ensures that each original point receives a class. Therefore, in certain embodiments wherein the pairwise calculation is performed, the present techniques do not result in any loss of resolution or "compression" of the original point cloud. However, in some embodiments, the pairwise calculation may not be performed, for example, when some loss of fidelity is acceptable in exchange for increased performance.

Once the M labeled points are incorporated back into the original point cloud, and the non-M points optionally pairwise labeled, each of the points are reassembled. In some embodiments, the output of the ML model may be a matrix of size M×N, wherein N is the number of classes. As noted above, a single point may be included in multiple subdivisions 762 due to overlapping subdivisions. In that case, the point may correspond to two or more distinct category classifications as the ML operation module 170 analyzes the multiple subdivisions 762 using the trained ML model. In that case, the spatial data module 164 may determine a final class/category by a voting method, wherein the class having the highest number of votes is kept for the respective point and any other classes are discarded.

Exemplary Computer-Implemented Methods

Figure 8:
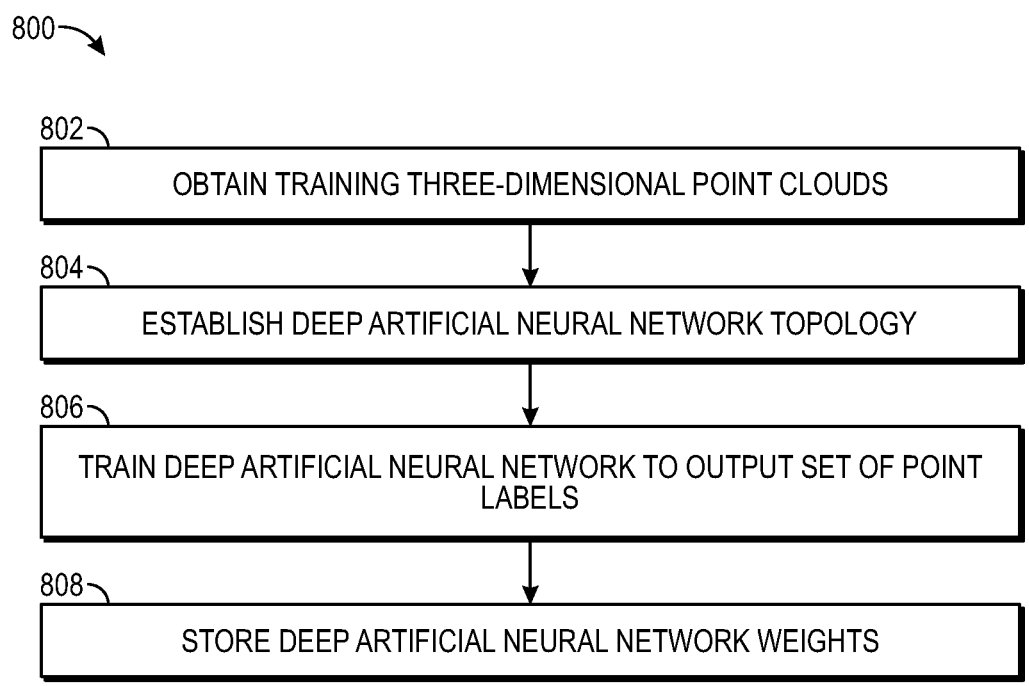
FIG. 8 depicts an exemplary method for using a trained machine learning model to generate a semantically-segmented three dimensional point cloud, according to one embodiment and scenario.

FIG. 8 depicts an exemplary computer-implemented method 800 for generating a semantically-segmented 3D point cloud. The method 800 may include obtaining one or more training three-dimensional point clouds, wherein one or more features of the point clouds include a respective label (block 802). For example, the one or more training three-dimensional point clouds may be point clouds wherein one or more 3D regions of pixels have been manually labeled. For example, a first group of pixels corresponding to a tree may be labeled "tree." A second group of pixels corresponding to a building may be labeled "building."

The method 800 may include establishing a topology of the deep artificial neural network, wherein the network topology may include an input layer and an output layer having a predetermined number of neurons (block 804). The number of input and output neurons may be set using a predetermined constant (e.g., 1024). The number of input and output neurons may correspond to the number of point within a distribution of points across a number of subdivisions of a training point cloud.

The method 800 may include training the deep artificial neural network to output a set of point labels by, for each of the training three-dimensional point cloud, subdividing each point cloud into a plurality of subdivisions, pre-processing the plurality of subdivisions, and analyzing the features and respective labels of the training three-dimensional point clouds to update a set of weights of the deep artificial neural network (block 806). For example, each of the subdivisions may be upsampled or downsampled. The points within each subdivision may be normalized, for example, by adjusting the value of the Z axis. The distance of points may be normalized by projecting the points onto a centered unit sphere. The pre-processing may be performed during training and operation of the deep artificial neural network.

The method 800 may include storing the set of weights of the deep artificial neural network as parameters for initializing the deep artificial neural network (block 808). Once the parameters are stored, an operation module (e.g., the ML operation module 170 of FIG. 1) may initialize the deep artificial neural network very quickly, without the latency/overhead of training.

The trained deep artificial neural network may output a set of labeled points, wherein each labeled point corresponds to a point in a 3D point cloud. The set of labeled points may be integrated into the 3D point cloud and stored, so that the 3D point cloud may include type information for every pixel (i.e., the 3D point cloud has been semantically segmented). The semantic segmentation may include elevation information for each point, in addition to positional information and colorspace information. A pairwise distance function may be used to label points not included in the upsampled/downsampled set of points. The output of the trained deep artificial neural network may be a vector including a multi-class probability classification for each point, wherein the probabilities within the vector sum to one for each point. The method 800 may include selecting the arg max of the vector. The subdivisions of the training 3D point clouds and the point cloud analyzed by the trained deep artificial neural network may be columnar in shape, and may overlap.

Exemplary Use Cases

In some embodiments, the present techniques may include the application of multiple/different deep learning techniques. For example, in some embodiments, a scene may be semantically segmented using a first ML model as discussed above, and a second ML model (e.g., a CNN) may be used to determine a roof geometry. A third ML model may be used to analyze the result of the semantic segmentation and the CNN output. The semantic segmentation information generated using the above-described techniques may be included in the 3D point cloud, and is useful for further analysis/operations in many domains.

Vehicles and Transportation

For example, additional use cases that may be implemented using the above-described techniques include transportation-related implementations, such as autonomous vehicle mapping wherein, for example, an autonomous vehicle generates mapping information and aerial imagery is collected. For example, the aerial imagery may correspond to a rural area wherein airspace is less tightly restricted. In another example, LIDAR is used in an urban/metro area.

Some embodiments may improve existing autonomous vehicle navigation and/or orientation systems. For example, the present techniques may modify an existing localization technique to provide more precise navigation by combining data from multiple systems (e.g., GPS data, LIDAR data including known landmarks, a camera system that centers on lanes, drone data, etc.). The point cloud data from each may be combined and spatially segmented using the present techniques to produce high resolution maps for the autonomous vehicle. As the autonomous vehicle operates, a module in the autonomous vehicle may analyze the spatial data in the high resolution maps (e.g., a class of an object, such as a pothole) to determine a navigation decision (e.g., a turning angle) or to provide information to a vehicle operator.

In one embodiment, a plurality of point clouds from multiple sources (e.g., the autonomous vehicle and the LIDAR data) may be merged together into a highly-accurate point cloud (e.g., 3D data accurate to 2.5 cm geospatially), advantageously minimizing the spatial error known to affect current-generation GPS-based systems. The combined point cloud may be used to provide high definition 3D maps that include elevation information for different purposes. For example, the combined 3D point cloud may be used in an autonomous vehicle implementation to detect potholes, analyze elevation differences for curbs, etc.

In one embodiment, non-color data (e.g., LIDAR) is combined with colorspace information in a point cloud. A generative adversarial network (GAN) may be used to add color information to non-color point clouds.

The present techniques may be used to implement functionality specific to the operation heavy equipment (e.g., a bulldozer, a tractor-trailer truck/semi, etc.). For example, semantic segmentation may be used to segment a map. While the heavy equipment is used, the slope and/or elevation information may be used by an engine control module to adjust engine speed/RPM in response to an incline. In one embodiment, one or more drones may scout a future route/future traffic to identify congestion. A route planning module may reroute the heavy equipment based upon the congestion. The drones may be used to determine future elevation. The engine control module may analyze the planning module to determine engine control decisions.

For example, when the engine control module identifies an aggressive slope ahead, the engine control module may increase engine torque to improve performance of the heavy equipment. When the route planning module identifies a steep decline, the engine control module may be caused to activate regenerative braking. The drones may be docked to the heavy equipment or dispatched via a waypoint along a route (e.g., at a roadside facility/installation) or a landmark (e.g., a rest area, a truck stop, etc.). The drones may facilitate the movement of multiple heavy equipment vehicles, such as assisting the entering/exiting of autonomous vehicles at a location. The drones may include self-service drones that are able to self-recharge.

In one embodiment, the present techniques facilitate risk assessment of an urban travel system. For example, the semantic segmentation information may be used to analyze the elevation and connection of roads/paths in a city. A significantly riskier road may be identified. A usage-based travel route may be identified wherein the risk associating with a particular road/path is used to plan travel. For example, a user may be notified (e.g., via a client computing device) that travel via a first road is longer, less expensive and/or less risky. The user may be notified that a second road is shorter, quicker, and/or more expensive. A route may be planned based upon a customer preference/objective (e.g., based upon the customer's preference with respect to a quickest path, a path including scenery, an eScooter route, etc.). A route may be planned based upon anticipated wear/tear on a vehicle due to changes in elevation or another aspect.

The present techniques may be used in an agricultural setting, such as in analyzing grass ways necessary for watersheds within a field. The present techniques may be used during the installation of irrigation, and/or to reduce erosion. Multi-spectral imaging may be used to determine crop health, whether fertilizers/chemicals are needed, etc. Elevation information may be used to determine whether to fill holes, to add earth, to plant an area, etc. The above-described drone technologies may be used to automate/navigate tractors such as when plowing to pick up or lower a plow based upon the elevation of a field. A drone may launch from a tractor and photograph a future route. Structure-from-motion may be used to uncover potential problems in the path of the tractor. The present techniques may be used to place field tiles and for crop rotation and planting decisions. The present techniques may be used to prevent chemical/manure runoff.

Facilities Operation & Management

The present techniques may be used for facilities management. For example, the present techniques may be used in golf course modeling.

A semantic segmentation 3D point cloud may allow golf course management to analyze precise terrain models. A virtual reality simulator may load a 3D point cloud to view a model/replica of the golf course for production purposes. The 3D point cloud including semantic segmentation information may be analyzed to detect erosion in a sand trap, green or fairway. For example, the 3D point cloud may be analyzed to determine how much sand is needed to replenish a sand trap, and/or to determine the acreage of a green, fairway, etc. The 3D point cloud including semantic segmentation information can be analyzed to determine irrigation and fertilizer usage, such as where irrigation heads are located in relation to one another.

The semantically segmented 3D point cloud may be used during play to determine the elevation/pitch/range of green in relation to where one is standing, and to determine play decisions/recommendations (e.g., club selection). The semantically segmented 3D point cloud enables an accurate base map with elevation information to inform assistive play applications, such as when teaching golf or when simulation a course in electronic gaming. A course may be duplicated or replicated based upon the semantic map, in some cases, using automated fabrication methods. The present techniques may be used to calculate par and to automate the delivery of products/services during play (e.g., a beverage, a snack, etc.). The semantically segmented 3D point clouds generated by the present techniques may be used in the provision of driverless/autonomous golf carts, and to prevent/reduce wear and tear on golf carts.

Aspects of play (e.g., the location of players and carts) may be added to the 3D point cloud. The 3D point cloud may be used to navigate the cart, for example by preventing driving on the green. In some embodiments, a system may use both the 3D point cloud and information from another source (e.g., a smart golf ball). A golf ball may be retrieved, e.g., from a hazard, via a drone. The semantically segmented 3D may be used to automatically identify course components (e.g., a fairway, green, rough vegetation, etc.). The present techniques may color-code the semantically segmented information within the point cloud to show course shape, curve, elevation, etc.

The present techniques may be used to implement functionality specific to other play, such as ski resorts, beaches, etc. For example, the semantically segmented 3D point cloud may be used to determine run difficulty, for hazard identification, to determine snow depth, and/or for maintenance (e.g., to identify runoff/erosion year over year). The 3D point cloud may be used to analyze locations for new ski lifts.

Modeling Peril

The present techniques may be used to model peril, such as a natural disaster. As discussed above, the present techniques enable high quality floodplain modeling.

Additionally, the present techniques may be used to implement wildfire risk management by, for example, detecting fuel loads in areas that correspond to higher likelihood of a wildfire affecting a structure/habitation. For example, the semantically segmented 3D model may be analyzed such that a fire break may be installed in a strategic location. A mapping module may automatically determine regions in the 3D point cloud where vegetation is located close to a road, a utility company property, an insured home, an insured business, etc. The "tree" label may be used to identify areas having more trees of a predetermined type (e.g., having a higher burn rate, a higher foliage density, etc.). Predictive modeling may be used to determine fire risk based upon whether trees are labeled as having leaves or needles. It should be appreciated that the ML training/operation discussed above may be adjusted to account for any necessary spatial/semantic features, in addition to/alternate to the examples discussed. The present techniques may analyze the size/features of a structure to determine the risk level represented by the structure. The proximity of multiple structures/objects may be analyzed to determine risk.

The present techniques may be used to model risk in hurricane modeling, tornado modeling, and for modeling other convective storms. For example, the density of trees and other natural dampeners may be analyzed. Wind simulation may be performed using the semantic segmentation information contained in the 3D point cloud.

The present techniques may be used to implement earthquake modeling. For example, some soil types are more susceptible to the propagation of seismic waves. The resolution of existing soil maps is poor. In one embodiment, one or more drones collect hyperspectral imaging to determine/measure soil composition. The methods and systems may semantically segment the imaging to label soil as bedrock, clay, sand, etc. As elevation information is helpful in floodplain modeling, the soil properties may determine risk to a structure (e.g., sandy soil may undergo liquefaction in an earthquake). The height/number of stories of a building may be modeled using the present techniques, as may construction/material types (e.g., framed, masonry, etc.).

The present techniques may be used to model a potential path of lava flow for evacuation modeling. For example, the change in elevation may be analyzed to determine the cooling of lava. Topography of the 3D point cloud may be analyzed to determine lava flow, and whether a building is at risk. Mudslides, avalanches, rock slides and other disaster scenarios may be analyzed using similar techniques. Emergency response (e.g., police and fire) may be staged based upon semantically segmented information in the 3D point cloud, by identifying safe and unsafe areas.

Underwriting, Claim Handling & Retail

The present techniques may be used for underwriting, claim handling and retail purposes. In the context of underwriting, the above-described peril modeling may be used in underwriting risk assessment.

A home insurance quote may be determined based upon analyzing a semantic segmentation 3D point cloud. For example, aspects of a dwelling may be counted/analyzed (e.g., a number of windows, a size of a garage, a number of stories, a roof composition, an estimated square footage, etc.). Additional characteristics may include a roof type, a chimney, a wall-mounted air-conditioning unit, etc. A drone may photograph storm damage to assess a damaged home, and to automatically handle a claim using detailed existing data and real-time data from a 3D point cloud. The present techniques may be implemented in the provision of crop insurance.

The present techniques may augment the 3D point cloud with historical customer data. When the model is missing information (e.g., has gaps) a GAN may combine 3D point cloud information with historical descriptions to fill the gaps. For example, when a structure is described in a textual description as having gray vinyl siding, the GAN may probabilistically fill the gaps using an imputed gray vinyl pattern.

The semantically segmented information may be used in fraud detection and for accident reconstruction. For example, a drone may capture imagery corresponding to a post-accident scene, and the scene may be semantically segmented. Certain information (e.g., broken glass, skid marks) may be used to detect the presence of an accident and/or as physical evidence (e.g., to determine speed).

The present techniques may facilitate access by retail customers. For example, an insurer may allow a user to purchase semantically segmented 3D point cloud data by encircling an area on a map. The insurer may provide the customer with the option to purchase one or more semantic 3D point cloud corresponding to the encircled area (e.g., a map of buildings, a map of vegetation, a map of the ground, etc.). The customer may submit one or more labels and a filtered 3D point cloud may be automatically generated and transmitted to the customer via a backend server. In some embodiments, the user may select different layers/models such as 3D models, orthomosaic models, etc. In one embodiment, the customer provides a 3D point cloud not including semantic segmentation information, and the insurer analyzes the customer's 3D point cloud using, e.g., the server 108 to generate a semantically segmented 3D point cloud. The semantically segmented point cloud may be delivered to the customer.

In some embodiments, an end user (e.g., a homeowner) flies a drone over the end user's property, and uploads images to the insurer, which provides the customer with a semantically segmented 3D point cloud, including an exterior inventory of home or other information. The insurer may provide a specific flight pattern for collecting optimal photos. With the end user's permission, the insurer may pass the segmented 3D point cloud to an underwriting and/or claims department. The claims/underwriting department may analyze the 3D point cloud in conjunction with existing data for different purposes (e.g., to detect structural changes). The present techniques may be used during the insurance application process. For example, a module operated by the insurer in the client device (e.g., an application executing in a consumer smart phone) may execute a drone flight path wherein the drone takes photographs of the applicant's home.

The present techniques may be used to generate physical 3D models that may include semantic segmentation information (e.g., surfaces of a different type may be printed using different colors of material using a 3D printer).

Smart phone applications may include the semantically segmented 3D point cloud information, and such information may be provided to developers via an API. Haptic feedback and/or voice feedback may be used to provide mapping capabilities. The height and/or slope of a workout may be analyzed, and custom workouts may be generated using the 3D point cloud information. In some embodiments, the semantically segmented 3D point clouds may be used to develop video games.

Construction & Urban Planning

The present techniques may be used in construction volumetrics. For example, in a major construction effort, the site must be cleared before building may begin, often at significant cost. Conventionally, estimates for cost are based upon crude measurements of land. The present techniques advantageously improve existing volumetrics measurement approaches by providing more precise ground elevation information. The elevation information may be used to calculate volumes of soil more accurately and to determine more refined cost estimates. The present techniques may be used in mining. The 3D map may be used to measure/analyze a building that is under construction.

The present techniques may be used during construction of an area (e.g., before building a residential subdivision). The segmented 3D point cloud may be used to survey land to determine locations for sewer management pumps, which may work more efficiently at particular relative elevations. The present techniques may be used to avoid building on saturated ground, for example, when installing concrete or asphalt. The present techniques may be used in utility management (e.g., for sewer, gas, power, and water). The present techniques may be used to model the location of street signs.

As noted above, the present techniques may be used to generate semantically segmented 3D point clouds that are very accurate. Such point clouds may be used to determine the attributes of buildings (e.g., blueprints, elevation of windows, how far windows are away from each other, the shadow of buildings, landscaping, architectural features, etc.). Such point clouds have many uses, including for historic preservation/modeling/reconstruction of historic or otherwise significant sites. Such 3D models may be combined with a customer's written description to rebuild a damaged home, filling in any gaps in the 3D point cloud with the customer's recollections.

What is claimed:

1. A deep artificial neural network for generating a semantically-segmented three-dimensional point cloud stored on a computer readable storage medium, wherein the deep artificial neural network is manufactured by a process comprising:
    obtaining one or more training three-dimensional point clouds, wherein one or more features of the point clouds include a respective label, and wherein at least one of the features corresponds to an outdoor structure;
    establishing a topology of the deep artificial neural network, wherein the network topology includes an input layer and an output layer having a predetermined number of neurons,
    training the deep artificial neural network to output a set of point labels corresponding to an outdoor scene by, for each of the training three-dimensional point clouds:
        subdividing the each point cloud into a plurality of subdivisions,
        preprocessing the plurality of subdivisions, and
        analyzing the features and respective labels of the training three-dimensional point clouds to update a set of weights of the deep artificial neural network; and
    storing the set of weights of the deep artificial neural network on the computer readable storage medium as parameters for initializing the deep artificial neural network.

2. The deep artificial neural network of claim 1, further comprising, wherein the pre-processing includes:
- computing a distribution of points across the plurality of subdivisions,
- one or both of (i) downsampling a set of points within the plurality of subdivisions, and (ii) upsampling a set of points within the plurality of subdivisions,
- spatially normalizing a set of points within the plurality of subdivisions, and
- collapsing a set of points within the plurality of subdivisions onto a unit sphere.

3. The deep artificial neural network of claim 2, further comprising:
- generating the semantically-segmented three-dimensional point cloud by using the trained deep artificial neural network to analyze a three-dimensional point cloud not used for training the deep artificial neural network, and
- storing the semantically-segmented three-dimensional point cloud on the computer-readable storage medium, wherein the point cloud comprises the set of point labels.

4. The deep artificial neural network of claim 2, wherein one or more of the point labels is determined using a pairwise distance function.

5. The deep artificial neural network of claim 2, wherein one or more of the point labels is determined by selecting an arg max of a vector of labels corresponding to the one or more point labels.

6. The deep artificial neural network of claim 1, wherein each of the plurality of subdivisions is columnar in shape.

7. The deep artificial neural network of claim 1, wherein the set of point labels includes a type and an elevation.

8. A computer-implemented method for training a deep artificial neural network to generate a semantically-segmented three-dimensional point cloud, comprising:
- obtaining one or more training three-dimensional point clouds, wherein one or more features of the point clouds include a respective label, and wherein at least one of the features corresponds to an outdoor structure;
- establishing a topology of the deep artificial neural network, wherein the network topology includes an input layer and an output layer having a predetermined number of neurons;
- training the deep artificial neural network to output a set of point labels corresponding to an outdoor scene by, for each of the training three-dimensional point clouds:
  - subdividing the each point cloud into a plurality of subdivisions,
  - preprocessing the plurality of subdivisions, and
  - analyzing the features and respective labels of the training three-dimensional point clouds to update a set of weights of the deep artificial neural network; and
- storing the set of weights of the deep artificial neural network as parameters for initializing the deep artificial neural network.

9. The computer-implemented method of claim 8, wherein the pre-processing includes:
- computing a distribution of points across the plurality of subdivisions,
- one or both of (i) downsampling a set of points within the plurality of subdivisions, and (ii) upsampling a set of points within the plurality of subdivisions,
- spatially normalizing a set of points within the plurality of subdivisions, and
- collapsing a set of points within the plurality of subdivisions onto a unit sphere.

10. The computer-implemented method of claim 9, further comprising: generating the semantically-segmented three-dimensional point cloud by using the trained deep artificial neural network to analyze a three-dimensional point cloud not used for training the deep artificial neural network, and
- storing the semantically-segmented three-dimensional point cloud on the computer-readable storage medium, wherein the point cloud comprises the set of point labels.

11. The computer-implemented method of claim 9, wherein one or more of the point labels is determined using a pairwise distance function.

12. The computer-implemented method of claim 9, wherein one or more of the point labels is determined by selecting an arg max of a vector of labels corresponding to the one or more point labels.

13. The computer-implemented method of claim 8, wherein each of the plurality of subdivisions is columnar in shape.

14. The computer-implemented method of claim 8, wherein the set of point labels includes a type and an elevation.

15. A server comprising: one or more processors; and a memory storing instructions that, when executed by the one or more processors, cause the server to
- obtain one or more training three-dimensional point clouds, wherein one or more features of the point clouds include a respective label, and wherein at least one of the features corresponds to an outdoor structure;
- establish a topology of the deep artificial neural network, wherein the network topology includes an input layer and an output layer having a predetermined number of neurons,
- train the deep artificial neural network to output a set of point labels corresponding to an outdoor scene by, for each of the training three-dimensional point clouds:
  - subdividing the each point cloud into a plurality of subdivisions,
  - preprocessing the plurality of subdivisions, and
  - analyzing the features and respective labels of the training three-dimensional point clouds to update a set of weights of the deep artificial neural network; and
- store the set of weights of the deep artificial neural network on the memory as parameters for initializing the deep artificial neural network.

16. The server of claim 15, the memory storing further instructions that, when executed by the one or more processors, cause the server to
- compute a distribution of points across the plurality of subdivisions,
- one or both of (i) downsample a set of points within the plurality of subdivisions, and (ii) upsample a set of points within the plurality of subdivisions,
- spatially normalize a set of points within the plurality of subdivisions, and
- collapse a set of points within the plurality of subdivisions onto a unit sphere.

17. The server of claim 16, the memory storing further instructions that, when executed by the one or more processors, cause the server to
- generate the semantically-segmented three-dimensional point cloud by using the trained deep artificial neural network to analyze a three-dimensional point cloud not used for training the deep artificial neural network, and store the semantically-segmented three-dimensional point cloud on the computer-readable storage medium, wherein the point cloud comprises the set of point labels.

18. The server of claim 16, wherein one or more of the point labels is determined using a pairwise distance function.

19. The server of claim 16, wherein one or more of the point labels is determined by selecting an arg max of a vector of labels corresponding to the one or more point labels.

20. The server of claim 15, wherein the set of point labels includes a type and an elevation.

* * * * *